(12) United States Patent
Rathi et al.

(10) Patent No.: US 8,438,138 B2
(45) Date of Patent: May 7, 2013

(54) MULTIPLE QUALITY OF SERVICE FILE SYSTEM USING PERFORMANCE BANDS OF STORAGE DEVICES

(75) Inventors: Unmesh Rathi, Sunnyvale, CA (US); Rex Rilen Hamilton, Ben Lomond, CA (US); Kurt Alan Shoens, Los Altos, CA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 12/454,337

(22) Filed: May 15, 2009

(65) Prior Publication Data

US 2009/0228535 A1    Sep. 10, 2009

Related U.S. Application Data

(60) Continuation of application No. 12/074,970, filed on Mar. 7, 2008, now abandoned, which is a division of application No. 11/245,718, filed on Oct. 8, 2005, now abandoned.

(51) Int. Cl.
*G06F 7/00* (2006.01)
*G06F 17/00* (2006.01)

(52) U.S. Cl.
USPC .......................................... 707/665; 707/823

(58) Field of Classification Search .................. 707/665, 707/609, 823
See application file for complete search history.

(56) References Cited

U.S. PATENT DOCUMENTS

| | | | |
|---|---|---|---|
| 5,018,060 A | 5/1991 | Gleb et al. |
| 5,140,683 A | 8/1992 | Gallo et al. |
| 5,193,171 A | 3/1993 | Shinmura et al. |
| 5,239,647 A | 8/1993 | Anglin et al. |
| 5,313,631 A | 5/1994 | Kao |
| 5,423,018 A | 6/1995 | Dang et al. |
| 5,537,585 A | 7/1996 | Blickenstaff et al. |

(Continued)

FOREIGN PATENT DOCUMENTS

WO    WO 2004/059486 A1    7/2004

OTHER PUBLICATIONS

Peterson, Strategic Profile Information Lifecycle Management: A Vision for the Future, publication date unknown, pp. 1-8, Strategic Research Corporation, Santa Barbara, CA.

(Continued)

*Primary Examiner* — Fred I Ehichioya
*Assistant Examiner* — Kris Mackes
(74) *Attorney, Agent, or Firm* — Marsh Fischmann & Breyfogle LLP; Daniel J. Sherwiter

(57) ABSTRACT

The invention relates to a multiple QoS file system and methods of processing files at different QoS. The file system allocates VLUNs and using rules chooses an initial QoS for a file when created and moves files to different QoS using rules. Users see a single unified space of files, while administrators place files on storage according to file attributes. A file system enhances the descriptive information for each file to contain the chosen QoS for the file. The invention classifies volumes (e.g., file systems or LUNs) according to application requirements and allocates space for volumes. An IT administrator configures volumes specifying size, type and priority. The host schedules I/O requests in priority queues using the volume definition to match applications and reduce seek time between volumes of different priorities. The data storage system therefore places data on the performance band of a storage device that best supports needs.

33 Claims, 24 Drawing Sheets

U.S. PATENT DOCUMENTS

| | | | |
|---|---|---|---|
| 5,548,795 | A | 8/1996 | Au |
| 5,724,539 | A | 3/1998 | Riggle et al. |
| 5,729,718 | A | 3/1998 | Au |
| 5,761,692 | A | 6/1998 | Ozden et al. |
| 5,784,646 | A | 7/1998 | Sawada |
| 5,822,780 | A | 10/1998 | Schutzman |
| 5,829,023 | A | 10/1998 | Bishop |
| 5,832,522 | A | 11/1998 | Blickenstaff et al. |
| 6,078,998 | A | 6/2000 | Kamel et al. |
| 6,085,262 | A | 7/2000 | Sawada |
| 6,154,817 | A | 11/2000 | Mohan et al. |
| 6,157,963 | A | 12/2000 | Courtright, II et al. |
| 6,327,638 | B1 * | 12/2001 | Kirby ............................... 711/4 |
| 6,330,572 | B1 | 12/2001 | Sitka |
| 6,466,952 | B2 | 10/2002 | Hanes et al. |
| 6,496,899 | B1 | 12/2002 | DeMoney |
| 6,651,125 | B2 | 11/2003 | Maergner et al. |
| 6,745,262 | B1 | 6/2004 | Benhase et al. |
| 6,775,673 | B2 | 8/2004 | Mahalingam et al. |
| 6,779,078 | B2 * | 8/2004 | Murotani et al. ............. 711/112 |
| 6,795,894 | B1 | 9/2004 | Neufeld et al. |
| 6,829,678 | B1 | 12/2004 | Sawdon et al. |
| 6,959,313 | B2 | 10/2005 | Kapoor et al. |
| 7,007,048 | B1 | 2/2006 | Murray et al. |
| 7,035,882 | B2 | 4/2006 | Takeda et al. |
| 7,051,188 | B1 | 5/2006 | Kubala et al. |
| 7,062,624 | B2 | 6/2006 | Kano |
| 7,065,611 | B2 | 6/2006 | Kano |
| 7,096,338 | B2 | 8/2006 | Takahashi et al. |
| 7,103,740 | B1 * | 9/2006 | Colgrove et al. ............. 711/162 |
| 7,107,298 | B2 | 9/2006 | Prahlad et al. |
| 7,136,883 | B2 | 11/2006 | Flamma et al. |
| 7,146,475 | B2 | 12/2006 | Perego |
| 7,165,059 | B1 * | 1/2007 | Shah et al. ............................ 1/1 |
| 7,197,490 | B1 | 3/2007 | English |
| 7,225,211 | B1 | 5/2007 | Colgrove et al. |
| 7,249,234 | B2 | 7/2007 | Higaki et al. |
| 7,257,606 | B2 | 8/2007 | Kapoor et al. |
| 7,260,634 | B2 | 8/2007 | Furukawa et al. |
| 7,269,612 | B2 | 9/2007 | Devarakonda et al. |
| 7,284,015 | B2 | 10/2007 | Pudipeddi et al. |
| 7,293,133 | B1 | 11/2007 | Colgrove et al. |
| 7,305,424 | B2 | 12/2007 | Chen et al. |
| 7,330,950 | B2 | 2/2008 | Matsunami et al. |
| 7,441,096 | B2 | 10/2008 | Kitamura |
| 2002/0095400 | A1 | 7/2002 | Johnson et al. |
| 2002/0143847 | A1 | 10/2002 | Smith |
| 2003/0004920 | A1 | 1/2003 | Coverston et al. |
| 2003/0177107 | A1 | 9/2003 | Brown et al. |
| 2003/0221060 | A1 * | 11/2003 | Umberger et al. ............. 711/114 |
| 2004/0010605 | A1 | 1/2004 | Furukawa et al. |
| 2004/0054850 | A1 | 3/2004 | Fisk |
| 2004/0057420 | A1 | 3/2004 | Curcio et al. |
| 2004/0158730 | A1 * | 8/2004 | Sarkar ........................... 713/200 |
| 2004/0193760 | A1 * | 9/2004 | Matsunami et al. ............. 710/36 |
| 2004/0255055 | A1 | 12/2004 | Lamberts |
| 2005/0066134 | A1 | 3/2005 | Tormasov et al. |
| 2005/0066138 | A1 | 3/2005 | Horn et al. |
| 2005/0097287 | A1 | 5/2005 | Melament et al. |
| 2005/0206538 | A1 | 9/2005 | Blaum et al. |
| 2006/0075191 | A1 | 4/2006 | Lolayekar et al. |
| 2006/0129771 | A1 | 6/2006 | Dasgupta et al. |
| 2006/0259728 | A1 | 11/2006 | Chandrasekaran et al. |

OTHER PUBLICATIONS

Author Unknown, EMC DiskXtender for Unix/Linux—Automated, Policy-Based File System Archiving, 2005, two pages (unnumbered), EMC Corporation, Hopkinton, MA.

Simitci, Storage Quality of Sevice, Storage Network Performance Analysis, 2003, pp. 187-198, Wiley Publishing, Inc., Indianapolis, IN.

Tanenbaum, File Systems, Modern Operation Systems, 2001, pp. 379-452, Prentice-Hall, Inc., Upper Saddle River, NJ.

International Search Report of PCT Application No. PCT/US2006/039104, Mar. 7, 2008.

International Written Opinion of PCT Application No. PCT/US2006/039104, Mar. 7, 2008.

A sensible customer approach: Pillar Customer Service. Designed around one customer. You, copyright 2005, Pillar Data Systems, Inc., US.

A sensible storage alternative: Pillar Axiom (TM) Storage System, copyright 2005, Pillar Data Systems, Inc., US.

From a market need comes an idea: A sensible storage alternative: Pillar Axiom (TM) Storage System, copyright 2005, Pillar Data Systems, Inc., US.

Corporate Backgrounder—Pillar (TM) Data Systems, copyright 2005, Pillar Data Systems, Inc., US.

Datasheet—Slammer Storage Controller, Pilot Policy Controller, Pillar Axiom (TM) Storage System, copyright 2005, Pillar Data Systems, Inc., US.

Datasheet—Brick Storage Enclosures, Pillar Axiom (TM) Storage System, copyright 2005, Pillar Data Systems, Inc., US.

Datasheet—Axiom File Replicator, Pillar Axiom (TM) Storage System, copyright 2005, Pillar Data Systems, Inc., US.

PCT International Preliminary Examination Report, International Application No. PCT/US06/17186, Jun. 4, 2009.

PCT Written Opinion of the International Searching Authority, International Application No. PCT/US06/17186, Jul. 7, 2008.

PCT International Search Report, International Application No. PCT/US06/17186, Jul. 7, 2008.

Supplementary European Search Report of EP Application No. EP 06759057, Mar. 4, 2011.

Supplementary European Search Report of EP Application No. EP 05824159, Apr. 24, 2009.

International Search Report of PCT/US2005/038930, Jun. 28, 2008.

Kurose, Computer Networking: A Top-Down Approach Featuring the Internet, 2000, pp. 572-579, Adison Weley Publishing Company.

* cited by examiner

MultiQoS File System

User Based QoS

Enter Desired Capacity by Quality of Service for the Current Users

| User ID | High QoS Capacity | Medium QoS Capacity | Low QoS Capacity | Archive QoS Capacity |
|---|---|---|---|---|
| User A | 100 MB | 500 MB | 10000 MB | 50000 MB |
| User B | 200 MB | 2000 MB | 40000 MB | 90000 MB |
| User C | 0 MB | 10 MB | 500 MB | 5000 MB |
|  | MB | MB | MB | MB |
|  | MB | MB | MB | MB |

FIGURE 2

MultiQoS File System
File Type Based QoS

Enter Desired Quality of Service for the File Types

| File Type | High QoS | Medium QoS | Low QoS | Archive QoS |
|---|---|---|---|---|
| MP3 | ☐ | ☐ | ● | ☐ |
| ZIP | ☐ | ☐ | ☐ | ● |
| TAR | ☐ | ☐ | ☐ | ● |
| PST | ☐ | ☐ | ● | ☐ |
| jPEG | ☐ | ☐ | ● | ☐ |
| C++ | ● | ☐ | ☐ | ☐ |
| PPT | ☐ | ● | ☐ | ☐ |

FIGURE 4

MultiQoS File System
Capacity Threshold Based QoS

Enter Desired Capacity Threshold to Migrate to Next Lower Quality of Service Level High QoS to Medium QoS

[ 80 ] %

Medium QoS to Low QoS

[ 60 ] %

Low QoS to Archive QoS

[ 85 ] %

Migration Size

[ 5 ] MB

- or -

High QoS to Medium QoS

[   ] MB

Medium QoS to Low QoS

[   ] MB

Low QoS to Archive QoS

[   ] MB

Migration Size

[   ] MB

Migration Alert?
✓ YES
○ No

FIGURE 5

MultiQoS File System
File Activity Based QoS

Enter File Activity Values to Migrate Between Quality of Service Levels

DOWNWARD MIGRATION

High QoS to Medium QoS

READS < [ 10 ] Accesses/Day
WRITES < [ 50 ] KB/Wk

Medium QoS to Low QoS

READS < [ 4 ] Accesses/Day
WRITES < [ 20 ] KB/Wk

Low QoS to Archive QoS

READS < [ 2 ] Accesses/Day
WRITES < [ 10 ] KB/Wk

UPWARD MIGRATION

Medium QoS to High QoS

READS > [ 12 ] Accesses/Day
WRITES > [ 75 ] KB/Wk

Low QoS to Medium QoS

READS > [ 5 ] Accesses/Day
WRITES > [ 5 ] KB/Wk

Archive QoS to Low QoS

READS > [ 1 ] Accesses/Day
WRITES > [ 1 ] KB/Wk

FIGURE 6

| 4-bit QoS Code | VLUN Quality Of Service |
|---|---|
| 1000 | HIGH |
| 0100 | MEDIUM |
| 0010 | LOW |
| 0001 | ARCHIVE |

FIGURE 10A

| VLUN Quality Of Service | 4-bit QoS Code |
|---|---|
| HIGH | 0000 0001 |
| MEDIUM | 0010 0011 |
| LOW | 0100 0101 0110 0111 |
| ARCHIVE | 1000 1001 1010 1011 1100 1101 1110 1111 |

FIGURE 10B

User System Configuration

Enter your Type, Capacity and Priority for the Volume (e.g., File system or LUN)

Volume Type

☑ NAS
☐ SAN

Capacity

[ 10 ] GB

Priority of Volume

[ High ▼ ]

FIGURE 18

MULTIPLE QUALITY OF SERVICE FILE SYSTEM USING PERFORMANCE BANDS OF STORAGE DEVICES

This application is a continuation of U.S. application Ser. No. 12/074,970, filed on Mar. 7, 2008 now abandoned, Methods of Provisioning A Multiple Quality of Service File System, which is a divisional of U.S. application Ser. No. 11/245,718, Multiple Quality of Service File Systems, filed on Oct. 8, 2005 now abandoned. U.S. application Ser. No. 12/074,970 and U.S. application Ser. No. 11/245,718 are incorporated by reference herein.

The present invention relates to management of file systems.

This application also incorporates by reference herein as follows:

U.S. application Ser. No. 10/264,603, Systems and Methods of Multiple Access Paths to Single Ported Storage Devices, filed on Oct. 3, 2002, now abandoned;

U.S. application Ser. No. 10/354,797, Methods and Systems of Host Caching, filed on Jan. 29, 2003, now U.S. Pat. No. 6,965,979 B2;

U.S. application Ser. No. 10/397,610, Methods and Systems for Management of System Metadata, filed on Mar. 26, 2003, now U.S. Pat. No. 7,216,253 B2;

U.S. application Ser. No. 10/440,347, Methods and Systems of Cache Memory Management and Snapshot Operations, filed on May 16, 2003, now U.S. Pat. No. 7,124,243 B2;

U.S. application Ser. No. 10/600,417, Systems and Methods of Data Migration in Snapshot Operations, filed on Jun. 19, 2003, now U.S. Pat. No. 7,136,974 B2;

U.S. application Ser. No. 10/616,128, Snapshots of File Systems in Data Storage Systems, filed on Jul. 8, 2003, now U.S. Pat. No. 6,959,313 B2;

U.S. application Ser. No. 10/677,560, Systems and Methods of Multiple Access Paths to Single Ported Storage Devices, filed on Oct. 1, 2003, now abandoned;

U.S. application Ser. No. 10/696,327, Data Replication in Data Storage Systems, filed on Oct. 28, 2003, now U.S. Pat. No. 7,143,122 B2;

U.S. application Ser. No. 10/837,322, Guided Configuration of Data Storage Systems, filed on Apr. 30, 2004, now U.S. Pat. No. 7,216,192 B2;

U.S. application Ser. No. 10/975,290, Staggered Writing for Data Storage Systems, filed on Oct. 27, 2004, now U.S. Pat. No. 7,380,157 B2;

U.S. application Ser. No. 10/976,430, Management of I/O Operations in Data Storage Systems, filed on Oct. 29, 2004, now U.S. Pat. No. 7,222,223 B2; and U.S. application Ser. No. 11/122,495, Quality of Service for Data Storage Volumes, filed on May 4, 2005, now U.S. Pat. No. 7,418,531 B2.

BACKGROUND

Data storage systems today must handle larger and more numerous files for longer periods of time than in the past. Thus, more than in the past active data is a shrinking part of the entire data set of a file system leading to inefficient use of expensive high performance storage. This impacts data storage backups and lifecycle management/compliance.

As background, a file is a unit of information stored and retrieved from storage devices (e.g., magnetic disks). A file has a name, data, and attributes (e.g., the last time it was modified, its size, etc.). A file system is that part of the operating system that handles files. To keep track of the files, the file system has directories. The directory contains directory entries which in turn consist of file names, file attributes, and addresses of the data blocks. Unix operating systems split this information into two separate structures: an i-node containing the file attributes and addresses of the data blocks and directory entries containing file names and where to find the i-nodes. If the file system uses i-nodes, the directory entry contains just a file name and an i-node number. An i-node is a data structure associated with exactly one file and lists that file's attributes and addresses of the data blocks. File systems are often organized in a tree of directories and each file may be specified by giving the path from the root directory to the file name.

To address inefficient use of expensive high performance data storage, third party archiving and hierarchical storage management (HSM) software migrate data from expensive high performance storage devices (e.g., Fibre channel) to lower cost storage devices such as tape or Serial ATA storage devices.

Archival and HSM software must manage separate storage volumes and file systems. Archival software not only physically moves old data but removes the file from the original file namespace. Although symbolic links can simulate the original namespace, this approach requires the target storage be provisioned as another file system thus increasing the IT administrator workload.

Archival and HSM software also don't integrate well with snapshots. The older the data, the more likely it is to be part of multiple snapshots. Archival software that moves old data does not free snapshot space on high performance storage. HSM software works at the virtual file system and i-node level, and is unaware of the block layout of the underlying file system or the block sharing among snapshots when it truncates the file in the original file system. With the two data stores approach, the user quota is typically enforced on only one data store, that is, the primary data store. Also, usually each data store has its own snapshots and these snapshots are not coordinated.

Archival software also does not control initial file placement and is inefficient for a large class of data that ultimately ends up being archived. Since archival software is not privy to initial placement decisions, it will not provide different quality of service (QoS) in a file system to multiple users and data types.

Archiving software also ends up consuming production bandwidth to migrate the data. To minimize interference with production, archiving software typically is scheduled during non-production hours. They are not optimized to leverage idle bandwidth of a storage system.

NAS applications may create large files with small active data sets. Some examples include large databases and digital video post-production storage. The large file uses high performance storage even if only a small part of the data is active.

Archiving software has integration issues, high administrative overhead and may even require application redesign. It may also require reconsideration of system issues like high availability, interoperability, and upgrade processes. It would be desirable to eliminate cost, administrative overhead, and provide different QoS in an integrated manner.

The Internet, e-commerce, and relational databases have all contributed to a tremendous growth in data storage requirements, and created an expectation that the data must be readily available all of the time. The desire to manage data growth and produce high data availability has encouraged development of storage area networks (SANs) and network-attached storage (NAS).

SANs move networked storage behind the host, and typically have their own topology and do not rely on LAN protocols such as Ethernet. NAS frees storage from its direct attachment to a host. The NAS storage array becomes a network addressable device using standard Network file systems, TCP/IP, and Ethernet protocols. However, SANs and NAS employ at least one host connected to data storage subsystems containing the storage devices. Each storage subsystem typically contains multiple storage nodes where each node includes a storage controller and an array of storage devices usually magnetic disk (hard disk drive) or magnetic tape drives.

In data storage systems, a host makes I/O requests (i.e., reads and writes) of the data storage subsystems. Each application that is the subject of the I/O request may require different quality of service (QoS). For efficiency each host can accumulate a batch of I/O requests from application users and transmit them to the data storage subsystem.

When the host receives I/O requests, it should process the higher priority requests before the lower priority I/O requests despite the problem that I/O requests arrive at the host without regard to priority. For example, the host should ensure a higher quality of service NAS file system or SAN LUN is not given lower priority than a lower QoS file system or LUN and retain the ability to configure file systems and SAN LUNs by different QoS.

The host must ensure all I/O requests are completed in a reasonable time and must support many applications simultaneously while delivering the appropriate performance to each. It would be helpful if the number of priority levels could be easily modified to allow for different priorities (e.g., two or more) to allow for better tuning of the system. The maximum number of I/O requests allowed per priority level could be then determined through testing and some qualitative analysis of different workloads.

SUMMARY OF THE INVENTION

The invention relates to a multiple QoS (multiQoS) file system and methods of processing files at different QoS according to IT administrator-specified rules. The invention allocates multiple VLUNs at different qualities of service to the multiQoS file system. Using the IT administrator-specified rules, the file system can assign an initial QoS for a file when created. Thereafter the file system moves files to a different QoS using IT administrator-specified rules. Users of the file system see a single unified namespace of files. A multiQoS file system enhances the descriptive information for each file to contain the QoS of the file.

The invention supports classification of volumes (e.g., file systems or LUNs) of a data storage system according to application requirements and allocates space for the volumes on storage devices (e.g., hard disk drives) accordingly. A person such as an IT administrator defines the volumes specifying size, type (e.g., file system or SAN LUN), and priority (e.g., high, medium, low, or archive). The invention schedules I/O requests to the storage devices using the volume definition to match the application requirements and reduce storage seek time between volumes of different priorities.

This invention allows an IT administrator to use the higher performance bands of storage for high performance applications and the remaining capacity of the storage devices for lower performance application. By allocating space in this manner, the data storage system places data on the storage device to support performance needs. In an embodiment, by controlling the scheduling of I/O requests, the data storage system allocates I/O request bandwidth according to user preferences and avoids poor performance caused by seeks across the different performance bands.

To retain the high performance of the outer band, the data storage system limits seek activity to other bands. In addition, the data storage system schedules I/O requests according to priority to enforce the allocation of I/O request bandwidth selected by the customer. To achieve these objectives, the data storage system queues I/O requests by priority and selects I/O requests to send to the data storage subsystems according to target percentages of use.

BRIEF DESCRIPTION OF THE DRAWINGS

FIG. 2 illustrates a user interface (UI) for entering the user capacity at each QoS.

FIG. 4 illustrates a UI for entering a QoS for each file type.

FIG. 5 illustrates a UI for entering capacity thresholds for migration of files.

FIG. 6 illustrates a UI for entering a required file activity to migrate files between different QoS.

FIG. 10A is an embodiment of a map between a 4-bit QoS code and four QoS levels.

FIG. 10B is another embodiment illustrating how a 4-bit QoS code can implement sixteen QoS levels.

FIG. 18 illustrates a display of a user interface for configuration of volumes.

DETAILED DESCRIPTION OF THE PREFERRED EMBODIMENTS

The following description includes the best mode of carrying out the invention, illustrates the principles of the invention, uses illustrative values and should not be taken in a limiting sense. The scope of the invention is determined by reference to the claims. Each part or step is assigned its own number in the specification and drawings. Many features of the invention will be now described using the phrase quality of service or simply QoS. This phrase is not essential to the invention. It is merely used to distinguish between different levels of performance and/or reliability.

Figure 1:
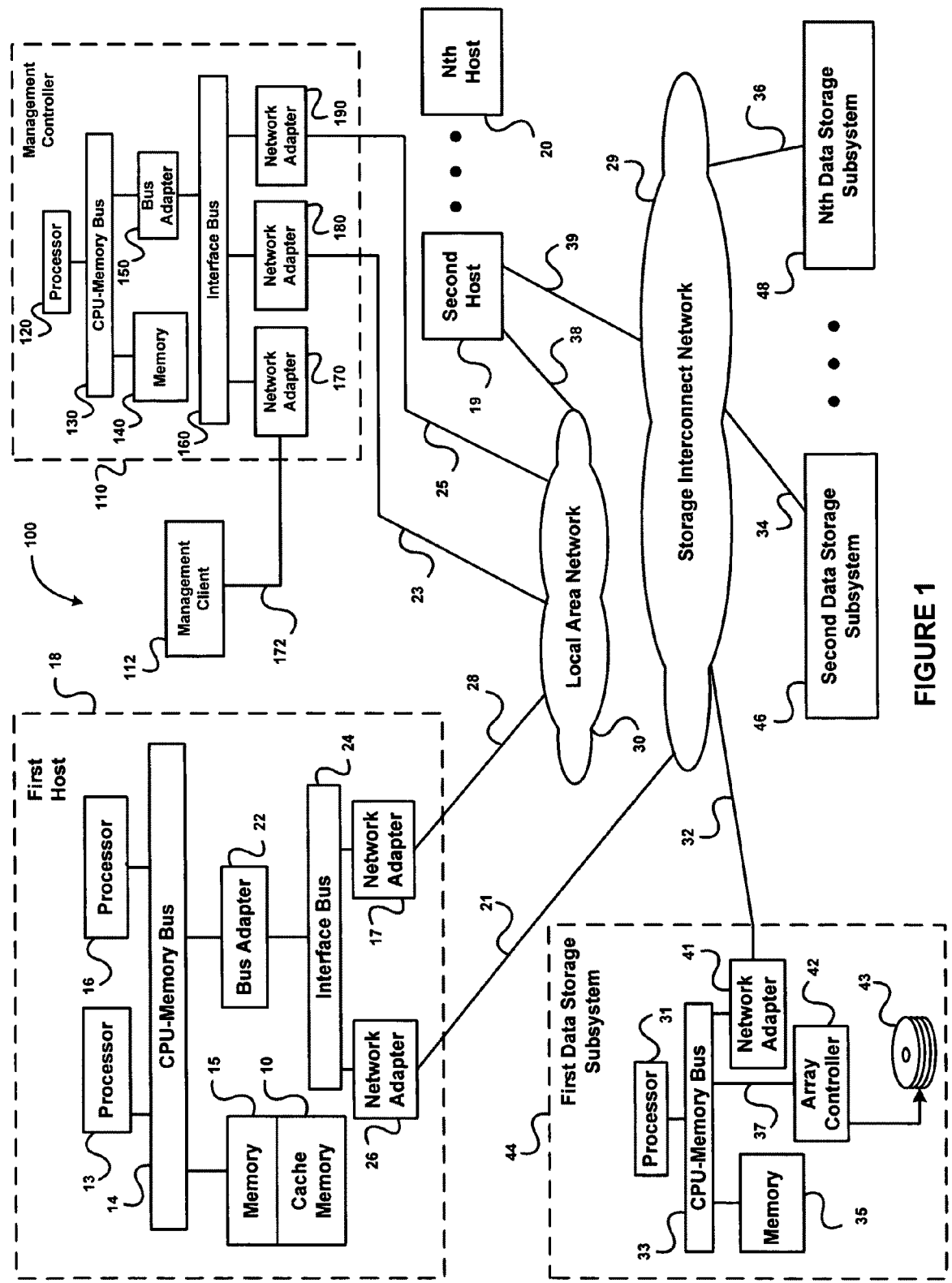
FIG. 1 illustrates a data storage system and provides details of a host, a data storage subsystem, and a management controller.

FIG. 1 illustrates a data storage system 100 that includes first through Nth hosts 18, 19 and 20, and first through Nth data storage subsystems 44, 46 and 48. Each host is a computer that can connect to clients, data storage subsystems and other hosts using software/hardware interfaces such as network interface cards and software drivers to implement Ethernet, Fibre Channel, ATM, SCSI, InfiniBand, etc. Hennessy and Patterson, *Computer Architecture: A Quantitative Approach* (2003), and Patterson and Hennessy, *Computer Organization and Design: The Hardware/Software Interface* (2004) describe computer hardware and software, storage systems, memory, caching and networks and are incorporated herein by reference.

Each host runs an operating system such as Linux, UNIX, a Microsoft OS, or another suitable operating system. Tanenbaum, *Modern Operating Systems* (2001), Bovet and Cesati, *Understanding the Linux Kernel* (2001), and Bach, *Design of the Unix Operating System* (1986) describe operating systems in detail and are incorporated by reference herein.

FIG. 1 shows the first host 18 includes a CPU-memory bus 14 that communicates with the processors 13 and 16 and a memory 15. The processors 13 and 16 used are not essential to the invention and could be any suitable general-purpose processor such as an Intel Pentium processor, an ASIC dedicated to perform the operations described herein, or a field programmable gate array (FPGA).

Each host includes a bus adapter 22 between the CPU-memory bus 14 and an interface bus 24, which in turn interfaces with network adapters 17 and 26. The first host 18 communicates through the network adapter 17 over link 28 with the local area network (LAN) 30 with other hosts. The first host 18 also communicates through the network adapter 26 over a link 21 with a storage interconnect network 29. Similarly, the second host 19 communicates over links 38 and 39 with the LAN 30 and the storage interconnect network 29, respectively. The storage interconnect network 29 also communicates over links 32, 34, and 36 with the data storage subsystems 44, 46, and 48, respectively. In sum, the hosts 18, 19 and 20 communicate with each other, the LAN 30 and storage interconnect network 29 and data storage subsystems 44, 46, and 48.

The LAN 30 and the storage interconnect network 29 can be separate networks as illustrated or combined in a single network, and may be any suitable known bus, SAN, LAN, or WAN technology such as Fibre Channel, SCSI, InfiniBand, or Ethernet, and the type of interconnect is not essential to the invention. See Kembel, *The FibreChannel Consultant, A Comprehensive Introduction* (1998), Kembel, *The Fibre-Channel Consultant, Arbitrated Loop* (1996-1997) The *FibreChannel Consultant, Fibre Channel Switched Fabric* (2001), Clark, *Designing Storage Area Networks* (2003), Clark, *IP SANs: A Guide to iSCSI, iFCP, and FCIP Protocols for Storage Area Networks* (2002) and Clark, *Designing Storage Area Networks* (1999), which are incorporated by reference herein.

FIG. 1 shows the first data storage subsystem 44 includes a CPU-memory bus 33 that communicates with the processor 31 and a memory 35. The processor 31 used is not essential to the invention and can be any suitable general-purpose processor such as an Intel Pentium processor, an ASIC dedicated to perform the operations described herein, or a field programmable gate array (FPGA). The CPU-memory bus 33 communicates through an adapter 41 and link 32 with the storage interconnect network 29 and through a link 37 to an array controller 42, such as a RAID controller, interfacing with an array of storage devices (e.g., a disk array 43).

U.S. application Ser. No. 10/677,560, Systems and Methods of Multiple Access Paths to Single Ported Storage Devices, filed on Oct. 1, 2003 describes suitable data storage subsystems, and is incorporated by reference herein. In alternative embodiments, any suitable controller and compatible storage device(s) can be used (e.g. tape drives or semiconductor memory) in the data storage subsystem. Massiglia, *The RAID Book: A Storage System Technology Handbook* (6th Edition, 1997) describing RAID technology is incorporated by reference herein.

In an embodiment, the disk array 43 is an array of hard disk drives that use zone bit recording (ZBR) to maximize capacity by creating data zones on each disk in a manner that maximizes the areal density (linear density in bits/in. and track density in trks/in.) within each data zone.

The innermost track of a disk has a finite linear bit density for recording data that is determined by several factors. Given the rotational speed of the disk drive, the bit density cannot be greater than the rate the read/write (R/W) electronics is able to write and read data. Given the dimensions of the disk, the length of the innermost track and the bit density are used to determine the capacity of that innermost track.

As the R/W heads move outward from the innermost track, the radius to each subsequent track increases and, accordingly, the length of each subsequent track increases and the resulting linear bit density decreases. If the data rate were to be held constant across the entire disk surface, the outermost track would contain the same amount of data (capacity) as the innermost track, even though the outermost track is approximately twice as long as the innermost track.

In order to take advantage of the increasing track length and the potential for increasing the overall capacity, the disk surface is divided into zones. At the innermost track of each zone, the linear density of the recorded data is increased to again meet the maximum linear bit density that the R/W technology allows. The tracks within each new zone contain higher data capacity than those of the previous zone as the heads move to the outer diameter of the disk. The zone boundaries may be determined by the physical format of the data. Linear densities will be readjusted upward (a new zone created) when a whole sector or multiples of whole sectors (including sector overhead), will fit on the new zone's innermost track. Typically, eight to fifteen data zones are created. ZBR provides increased performance due to the increased data capacity in each zone as the R/W heads move from the innermost zone to the outermost zone.

A host may access secondary storage devices (e.g., hard disk drives) through a VLUN (virtual logical unit number) that abstracts the storage device(s) as a linear array of fixed-size blocks. A logical block address (LBA) identifies each fixed-sized block. The data storage system constructs a VLUN from all or parts of several physical storage devices such as disk drives. To make a large VLUN, a data storage system may concatenate space allocated from several storage devices. To improve performance, the data storage system maps adjacent regions of VLUN space onto different physical storage devices (striping). To improve reliability, the system holds multiple copies of a VLUN on different storage devices (mirroring). In an embodiment, the term volume encompasses one or more VLUNs used to store SAN LUNs and/or file systems.

Users request write and read operations of the data storage system 100. An IT administrator can assign an archive, low, medium, or high priority for each volume to handle each type of work (e.g., archive, backup, document production, and transaction processing).

In other embodiments, the IT administrator assigns one of a plurality of priorities to each volume. Thus the IT administrator could assign a higher or lower priority to a volume. Also the term for each priority need not be labeled as "archive, low, medium, or high," but could be any suitable term that assists the user in understanding its predicted performance relative to other priorities.

In operation, a user requests an I/O operation of one of the hosts 18, 19, or 20 which will transmit the request on the LAN 30 or the storage interconnect network 29 to one or more of the data storage subsystems 44, 46, or 48.

If a write is received, the data storage subsystem 44 can use a write-through scheme and not acknowledge the write until the data is written to nonvolatile memory (e.g., disk array 43). This ensures data consistency between the host and data storage subsystem in the event of a power failure, etc.

In a write-back scheme, the data storage subsystem 44 acknowledges the write before data is written to disk array 43 and stores the data in nonvolatile memory (e.g., battery backed RAM) until written to the disk array to ensure data consistency.

FIG. 1 illustrates a management client 112 that communicates over link 172 (e.g., using Ethernet) with a management controller 110. FIG. 1 illustrates one embodiment of a user interface such as a management controller 110 and the management client 112 that present the IT administrator with high level choices to configure the data storage system 100. The management controller 110 includes a CPU-memory bus 130 that communicates with a processor 120 and a memory 140. The processor 120 can be any general-purpose processor such as an Intel Pentium processor, a dedicated ASIC or FPGA. The management controller 110 includes a bus adapter 150 between the CPU-memory bus 130 and an interface bus 160 interfacing with network adapters 170, 180, and 190. The management controller 110 communicates through network adapter 180 over link 23 or link 25, the LAN 30, and the link 28 with the first host 18. The management client 112 includes the hardware, plus display and input devices such as a keyboard and mouse.

Provisioning a MultiQoS File System

A multiQoS file system can be provisioned by specifying the initial, incremental and maximum capacities of the storage or specifying the initial, incremental, and maximum storage for each QoS VLUN. Or a multiQoS file system can be provisioned by specifying the overall initial, incremental, maximum storage and providing percentages for each QoS.

The provisioning can be also driven by rules. FIG. 2 illustrates a user interface (UI) at the management client 112 that allows the IT administrator to enter values of user capacity at different QoS. The user capacities can be determined by departmental requirements, budgets, or by dividing the total available storage at each QoS among the users. The UI is illustrated as a graphical user interface (GUI) but could be a command line interface. Also the name and number of column headings in the table: high QoS, medium QoS, low QoS and archive QoS are not essential to the invention; other headings such as high, medium, and low performance, or high, medium, low priority and so forth can be used as long as they meet user requirements.

The UI can be implemented in client software or in a client-server architecture. If the UI is implemented as a Web application, the IT administrator can open a browser (e.g., Microsoft Internet Explorer or Firefox) on management client 112, request a Web form (FIG. 2), enter values of user capacity in the Web form, and submit the values to the management controller 112. A Web server in or connected to the management controller 112 will connect or will have an established connection to a database (not shown) that stores the values. In an alternative to the Web application, a relational database server can run in a management controller 110 that waits for a database client running on management client 112 to request a connection. Once the connection is made (typically using TCP sockets), the database client sends a SQL query to the database server, which returns a document to receive user capacity values from the database client.

The management controller 110 next transmits the user capacity values to the first host 18 that allocates a VLUN in memory 15 at each QoS. The file system provides capacity on a VLUN to place file system core structures (e.g., boot block, super block, free space management, i-nodes, and root directory). For example, the management controller 110 can place the core file system structures in the highest QoS VLUN.

Figure 3:
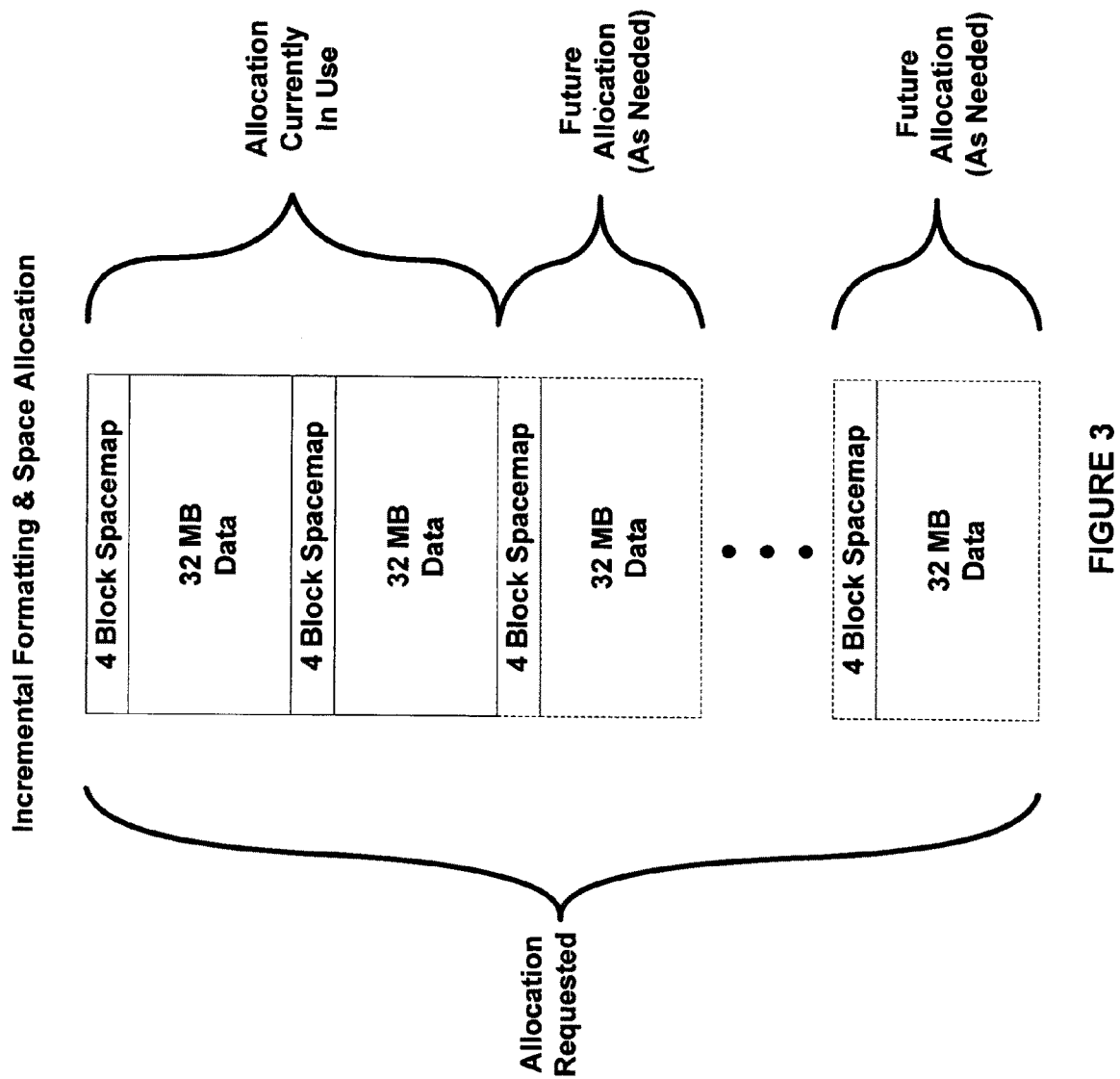
FIG. 3 illustrates incremental formatting and space allocation.

To format a multiQoS file system, the file system writes the core structures into the chosen VLUN. The file system then initializes space allocation data structures in all of the VLUNs assigned to the multiQoS file system. In an embodiment, the file system maintains a high water mark for each VLUN that indicates how far in each VLUN the file system has initialized space allocation information. In an embodiment, the multiQoS file system formats a limited amount of space allocation information such as 32 megabytes (MB). If the file system runs out of the initial 32 MB allocated to a VLUN, it can format the next 32 MB and updates the high water mark to show where to format the next increment of space for that VLUN. FIG. 3 illustrates one method of incremental formatting and space allocation. U.S. application Ser. No. 10/616, 128, Snapshots of File Systems in Data Storage Systems, filed on Jul. 8, 2003, incorporated by reference herein, describes one format of the file system blocks.

Expanding a MultiQoS File System

After the IT administrator creates a multiQoS file system, a VLUN at a certain QoS and attached to the file system may run short on space. When the multiQoS file system reaches the high water mark that indicates how much capacity has been used up for a VLUN, it requests additional space be allocated to that VLUN, the management controller 110 expands the VLUN corresponding to the QoS and notifies the file system of the expansion. The file system formats the space allocation information in the VLUN to account for the new space. The IT administrator can specify a spill-over rule where instead of expanding the exhausted QoS VLUN, the new data may be spilled over into higher or lower QoS VLUNs that are already allocated to the multiQoS file system. As an example, the rule could enable spill over when allocated space utilization is below a threshold (e.g., 40% of total storage capacity).

The IT administrator can also add a new QoS to the multiQoS file system. In that case, the management controller 110 will allocate a new VLUN at the new QoS and attach it to the multiQoS file system. The file system formats all or a portion of the space allocation information in the new VLUN.

The IT administrator will also need to update rules that select the QoS for files to use the new QoS. A later section describes how to change the rules.

Compacting and Shrinking a MultiQoS File System

The IT administrator can compact a multiQoS file system by migrating all files from the VLUN to be vacated to remaining VLUNs. Once a VLUN is completely empty, it can be returned to the storage pool, thus shrinking the storage allocated to the multiQoS file system. This migration can be done by adding a rule or it can be done on demand as described in the section on synthetic namespace below.

Creating a File in a MultiQoS File System

When a user creates a new file in a multiQoS file system, the file system checks the rules associated with the file system to select the initial QoS for the file and its attributes. The file system then allocates blocks for the file from the VLUN assigned to the file system with the desired QoS.

In some protocols, such as Common Internet File System (CIFS), applications can specify the amount of space to reserve for the file. The file system can use the reserved space information to estimate the eventual size of the file and in turn use that estimate in the rules. For example, if the rules place files larger than 1 gigabyte on low QoS storage and the CIFS application reserves four gigabytes (GB), the file system will place such a file on low QoS storage. Norton et al., *Storage Networking Industry Association, Common Internet File System (CIFS)—Technical Reference Revision:* 1.0 (2002) describe the details of CIFS and is incorporated by reference herein.

Other protocols, such as Network File System (NFS), do not permit specifying the intended size of a file. Thus, an IT administrator can specify rules storing part of a file (e.g., first gigabyte) at one QoS and another part at another level. A multiQoS file system can also indicate the QoS of a block by using the top bits of the block address so a file can have blocks at different qualities of service levels.

Establishing Initial Placement Rules

The IT administrator can specify initial placement rules that establish QoS by file type. Many operating systems support two-part file names. For example, in a file named "file1.PDF", the extension PDF is the file type. Linux and Unix also support three-part file names such as "file1.PDF.Z." The extensions ("PDF" and "Z") indicate the file type is PDF compressed with the Ziv-Lempel algorithm.

FIG. 4 illustrates a UI that can be implemented using the same type of software and hardware described in FIG. 2. It permits the IT administrator to establish a QoS by file type. In FIG. 4, the IT administrator has clicked the buttons in the UI to place C++ files in high QoS, Powerpoint (.ppt) in medium QoS, OutLook (.pst), MP3, and JPEG in low QoS, and ZIP and TAR in archive QoS. Tanenbaum, *Modern Operating Systems* (2001), including chapter six, incorporated by reference herein, describes file systems and lists other file types. The file type as indicated by file name extension is an example of more general rule which matches file name to any predetermined pattern (e.g. "*foo*.txt") to deduce initial QoS for the file.

Another placement rule is to place the files according to user ID or group ID. For example, an email service provider could use the rule to place emails belonging to premium customers in high QoS storage.

Another placement rule is to place files by file size. For example, a university administrator may restrict very large files typically downloaded by students to low QoS despite quota rules that might have allowed them to be placed on a higher QoS.

Another placement rule is to place files by folder. All files in a particular folder of the file system are placed in the same QoS VLUN. Placement by folder allocates differential QoS storage to projects as a single file system.

Migration Rules

The IT administrator can specify other migration rules. FIG. 5 illustrates a UI for the IT administrator to set capacity thresholds for migration of files. If, as shown 20% or 500 MB of the high QoS storage is used, files will migrate down, as explained below, from high QoS to medium QoS. If combined with a first-in-first-out rule, this results in migration of older files to lower QoS. If 60% or 1,000 MB of medium QoS storage is used, files migrate down from medium QoS to low QoS, and if 85% or 10,000 MB of low QoS storage is used, files migrate down from low QoS to archive storage. As a benefit, migration tends to defragment files.

It is suggested to migrate a file in a chunk (also referred to as an extent) in a background process rather than all at once to avoid adverse impact to the bandwidth of the storage interconnect network. An IT administrator can define the chunk size also referred to as the migration size in terms of MB. A single migration size can be used for all migration whether up or down as shown in FIG. 5. The migration size can also depend on whether the migration is up or down or on even the pair of QoS involved. The UI also allows the IT administrator to set a migration alert to send an email alert to someone or simply be displayed at the management client 112.

The multiQoS file system can set a file activity rule to trigger migration of a file. Reading and writing to a file over time is a measure of file activity. FIG. 6 illustrates a UI for entering values of file activity for migration of a file between QoS. If, as shown, the file has less than ten reads per day or less than 50 KB per week is written to the file, the file migrates from high to medium QoS. Similarly, if the file has less than four reads per day or less than 20 KB per week is written to the file, the file migrates from medium to low QoS. Finally, if the file has less than two reads per day or less than 10 KB per week is written to the file, the file migrates from low to archive QoS.

FIG. 6 also illustrates fields for entering values of file activity for upward migration of a file. If, as shown, the file has more than twelve reads per day or more than 75 KB per week is written to the file, the file migrates from medium to high QoS. Similarly, if the file has more than five reads per day or more than 5 KB/week is written to the file, the file migrates from low to medium QoS. And if the file has more than one read per day or more than 1 KB/week is written to the file, the file migrates from archive to low QoS.

Figure 7:
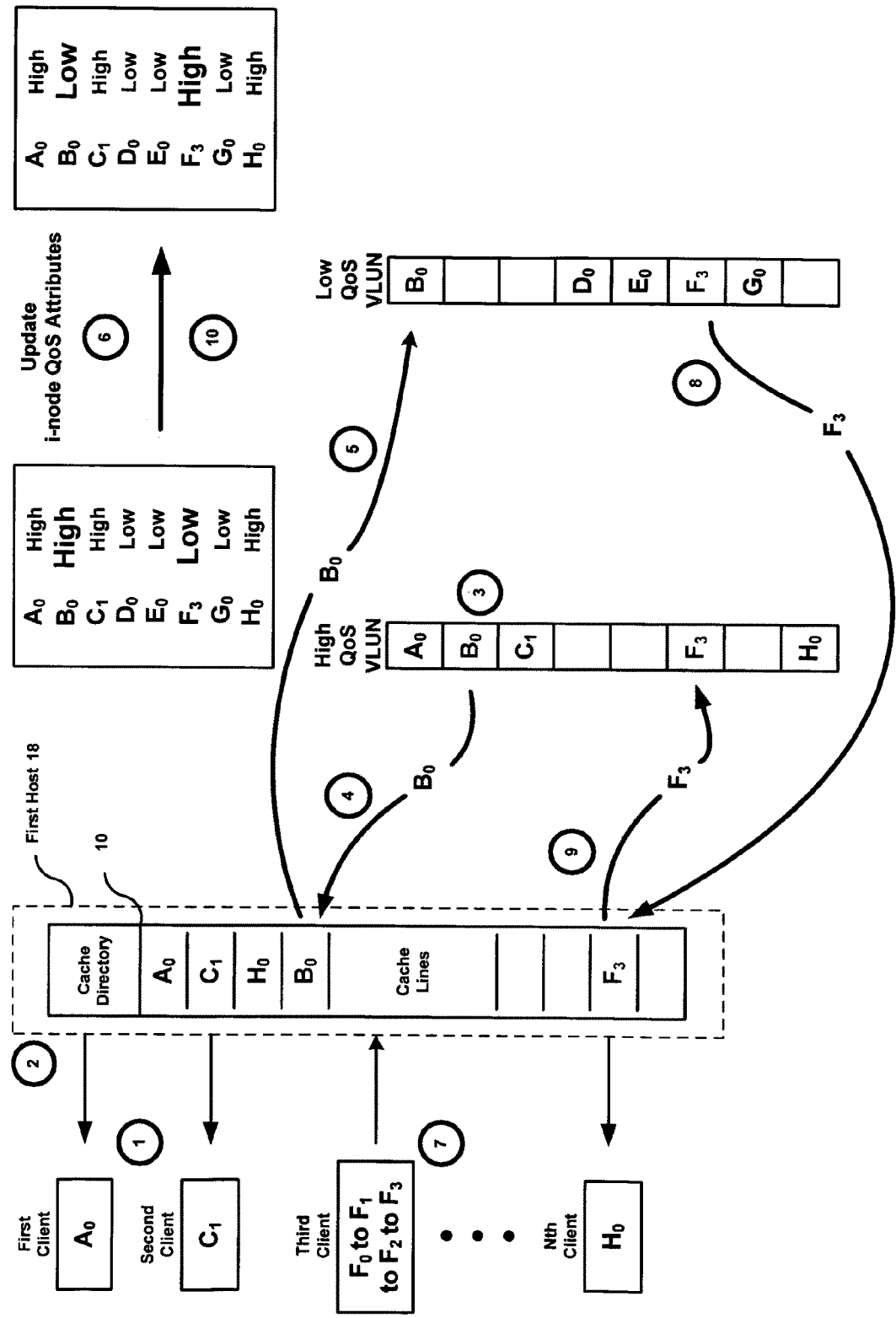
FIG. 7 illustrates migration of files between different QoS.

FIG. 7 illustrates an abstract view of a data storage system engaged in file migration. The data storage system includes a first host 18, including a cache memory 10, and two QoS of secondary storage represented by a high QoS VLUN and a low QoS VLUN. Letters A through H represent files. The subscript of each letter represents the version of a file. The first through the Nth client applications will access the files using processes and threads.

To illustrate, assume the IT administrator sets a rule that if a file is not accessed once in a month, it should migrate from high to low performance storage as represented by high QoS VLUN to low QoS VLUN. We also assume if a file is accessed more than once in a month, it should migrate from low to high performance storage. We look at one month in this example, but the time period can be shorter or longer. Finally, we assume steps 1-3 and 7 occur in the month. At step 1, the first client reads file $A_0$, the second client reads C, the third client accesses the file F, writing versions $F_1$-$F_3$, and the Nth client reads file $H_0$. At step 2, the host stages the active files in cache memory as appropriate. At step 3, the host runs a background process that checks file attributes, applies the rules and identifies all files that need to migrate.

Based on this, the host migrates inactive file $B_0$ from high to low performance storage. To accomplish this, the host stages file $B_0$ into cache at step 4. Further, the host writes file $B_0$ to the low QoS VLUN at step 5. At step 6, the host updates the directory entry or i-node of file $B_0$ to indicate it is now in the low QoS VLUN. At step 7, the host identifies file F was repeatedly accessed during the month so must migrate from low to high performance storage. At step 8, the host stages file $F_3$ into cache, and at step 9 writes file $F_3$ to the high QoS VLUN. At step 10, the host updates the directory entry or the i-node of $F_3$ to indicate its blocks are in the high QoS VLUN. A background process writes the files to secondary storage when appropriate in either a write-back or write-through scheme.

Figure 8:
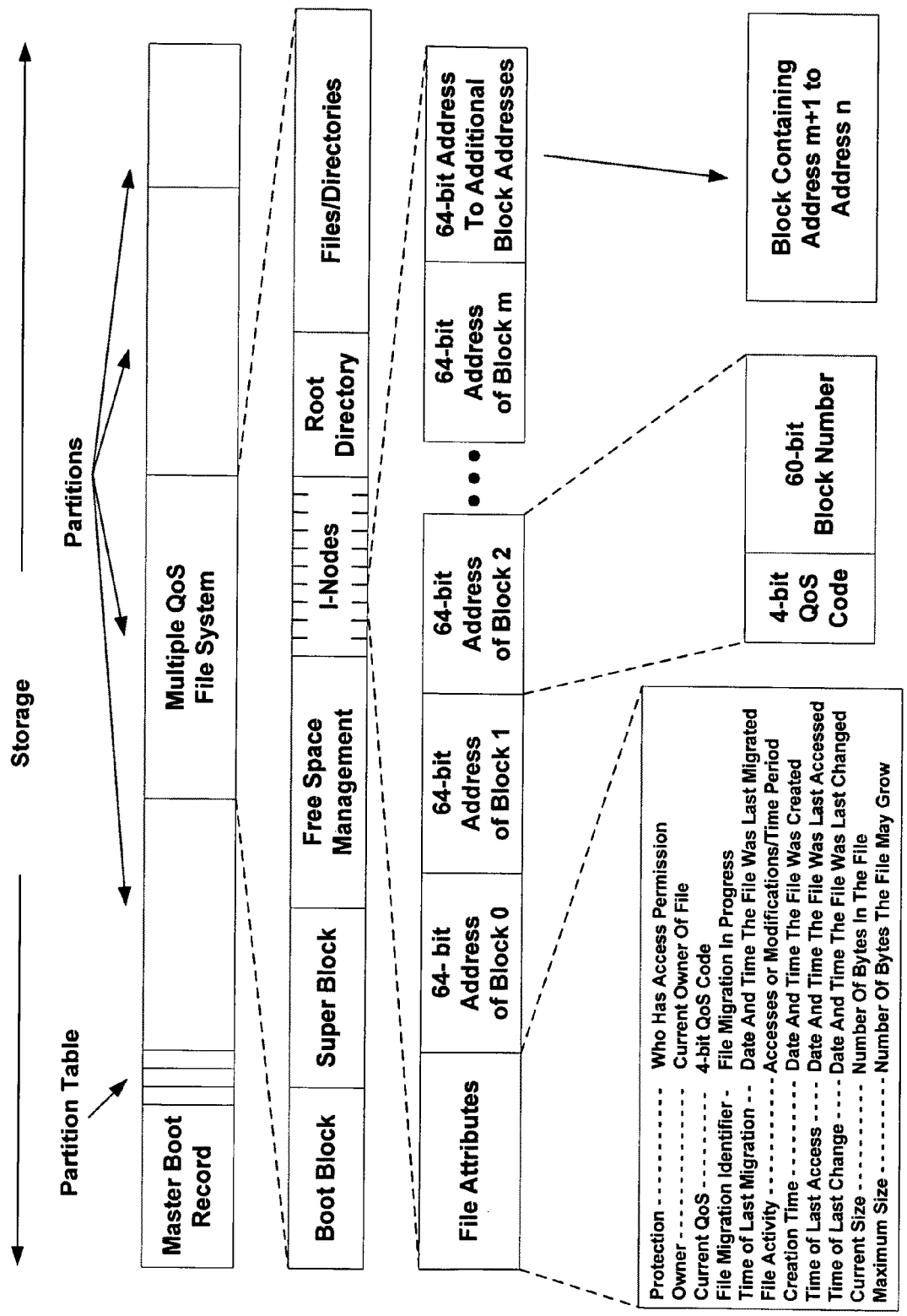
FIG. 8 illustrates a layout of a multiQoS file system.

FIG. 8 illustrates a possible layout of a multiQoS file system. In an embodiment, the layout is stored on secondary storage such as data storage subsystems shown in FIG. 1 and/or host memory. The storage is divided up into partitions, each capable of containing an independent file system. As shown, the partition contains a multiQoS file system. A master boot record (MBR) is used to boot the data storage system and contains a partition table that gives the first and last address of the partition, and marks a partition as active. When the data storage system is turned on, a BIOS reads the boot block which loads an operating system containing the multiQoS file system. In an embodiment, the multiQoS file system contains a super block with information about file system layout, including the number of i-nodes, the number of blocks, and other information for the IT administrator. The multiQoS file system includes free space management (information about free blocks) using bitmaps or list of pointers. Next, the multiQoS file system has i-nodes, the root directory (the top of the directories), files and directories. FIG. 8 suggests placing i-nodes in a linear array. However, the i-nodes are better arranged in a data structure that permits fast searching and dynamic sizing such as a B-tree. Cormen et al., *Introduction to Algorithms* (2003) describes B-trees at pages 434-454 and other suitable data structures for the i-nodes as well as for the file system and is incorporated by reference herein.

MultiQoS File System Representation

FIG. 8 also illustrates each i-node contains file attributes and addresses of data blocks such as disk blocks. The file attributes could include the following attributes:

| Field | Description |
| --- | --- |
| Protection | Who Has Access Permission |
| Owner | Current Owner Of File |
| Current QoS | QoS Code (e.g., 4-bit QoS code) |
| Migration Identifier | Migration In Progress (e.g., Migration flag = 1) |
| Time of Last Migration | Date And Time File Last Migrated |
| File Activity | Number Of Accesses Or Modifications Per Time |
| Creation Time | Date And Time The File Was Created |
| Time of Last Access | Date And Time The File Was Last Accessed |
| Time of Last Change | Date And Time The File Was Last Changed |
| Current Size | Number Of Bytes In The File |
| Maximum Size | Number Of Bytes The File May Grow |

A block can point to additional block addresses. FIG. 8 illustrates a block pointing to a block containing addresses m+1 to address n. If a block is 1 KB and address is 32-bits, a single indirect block may contain up to 256 block addresses. Further, a double indirect block can contain the addresses of 256 indirect blocks and so forth. Thus, the multiQoS file system represents data structures through blocks at fixed block addresses that in turn refer to other blocks via dynamically-assigned block addresses. An embodiment of the multiQoS file system using 64-bit block addresses referring to 4,096 byte blocks can grow to approximately 10 billion terabytes. A simple encoding uses some of the 64 bits of the block address to indicate a QoS.

The total address space represented by the bits in the block address (e.g. 64-bits or 32-bits) can be partitioned statically among the multiple VLUNs of the multiQoS file system. A fixed or variable number of the bits in the block address is used as an index to look up the corresponding VLUN, while the remaining bits are used to determine the address of the block within that VLUN. Such static partitioning allows each volume to grow independently to a very large maximum limit. In an embodiment, the highest order bits of the block address may be used as index into a table of VLUNs and the remaining bits be used to determine the block address in that VLUN. In an embodiment with two VLUNs, the file system can map one VLUN from the lowest address and grow the second VLUN in reverse from the highest address so that they grow together and better use the entire address space.

Large File Extent Migration and Access Tracking

Figure 9:
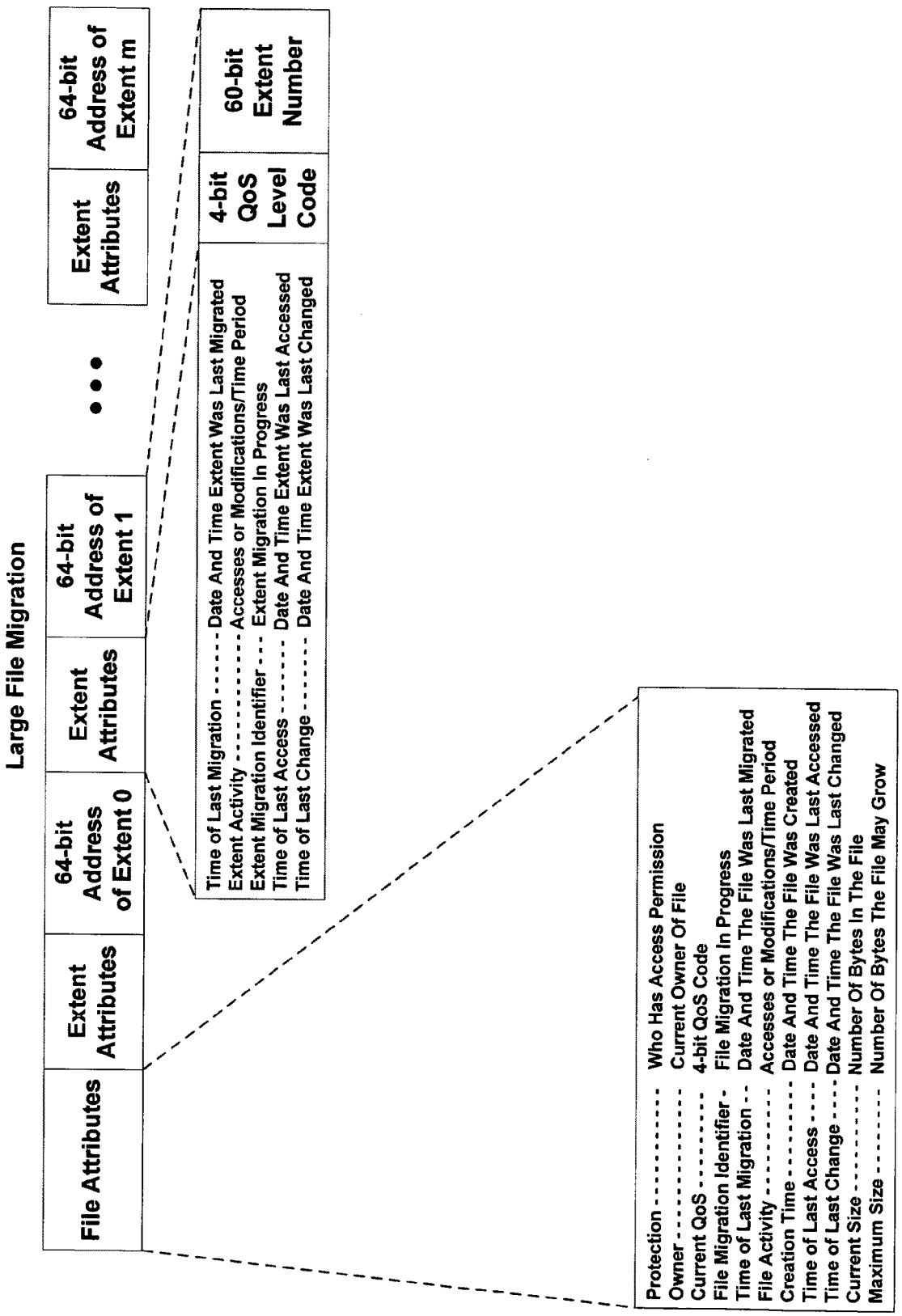
FIG. 9 illustrates file attributes and extent attributes of a large file.

An IT administrator can specify that the migration rules be applied to each extent (i.e., a contiguous allocation of blocks) of a large file. A large file is larger than a certain size such as 1 GB. FIG. 9 illustrates a possible layout of a large file. The large file has file attributes, plus a plurality of extents, and each extent has its own attributes, referred to as extent attributes. For large files stored on the multiQoS file system, the file system maintains extent attributes to permit access tracking and QoS information at each extent of the large file. As clients access a large file, the file system updates the access tracking information in the attributes of each extent. For example, the file system can separately track 4 MB extents of the large file.

To illustrate large file extent migration, assume the IT administrator sets a file activity rule that if any extent of a large file is not accessed once in a month, it migrates from high to low performance storage represented by high QoS VLUN to low QoS VLUN. Also assume if an extent of a large file is accessed more than once in a month, it migrates from low to high performance storage.

The file system uses the access tracking information in the extent attributes to select the QoS for each extent of the large file. When the file system migrates an inactive extent as defined by the IT administrator rules, the file system updates the QoS information in the extent attributes and performs the actual migration as described earlier in FIG. 7 for migrating whole files. After migration of an extent the large file will exist at multiple qualities of services, all under the same file name. A large database file containing the records of all new, current, and past employees can be stored in appropriate performance storage automatically using less IT administrators.

In an embodiment, the file system maintains a cache of access tracking information for a large file in host main memory and only saves the information to extent attributes periodically to reduce the overhead of maintaining the information.

FIG. 10A illustrates a map of 4-bit QoS codes representing four different QoS depicted in the UIs of FIGS. 4-6. The multiQoS file system can encode the QoS in part of the block address. FIG. 10B illustrates how 4-bits can represent sixteen QoS levels and the allocation among VLUN quality of service levels can differ in size. In a 64-bit system, the remaining 60-bits can be used to address approximately 1018 blocks (1 billion terabytes) within the VLUN in a multiQoS file system. Everywhere the file system uses a block address to point to a block, the file system can extract part of the block address (e.g., 4-bits) to index into an array of VLUN identifiers provided to the file system by the management controller 110. The multiQoS file system uses the remaining bits of the block address (e.g., 60-bits) to find the desired block in the selected VLUN.

Figure 11A:
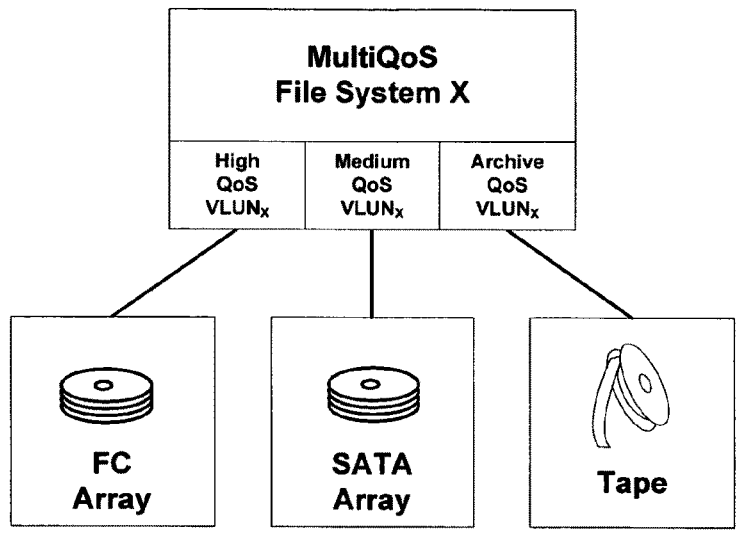
FIG. 11A illustrates a multiQoS file system, the associated VLUNs, and the performance grades of storage devices.

FIG. 11A illustrates a high level view of the multiQoS file system X and its VLUNs each having a QoS coupled to the performance of a storage device. In this embodiment, the management controller 110 configures the data storage system as described earlier so that higher performance storage such as Fibre Channel and Serial ATA are associated with the high QoS VLUN and medium QoS VLUN, respectively, and the lower performance storage such as tape is associated with low QoS VLUN.

Figure 11B:
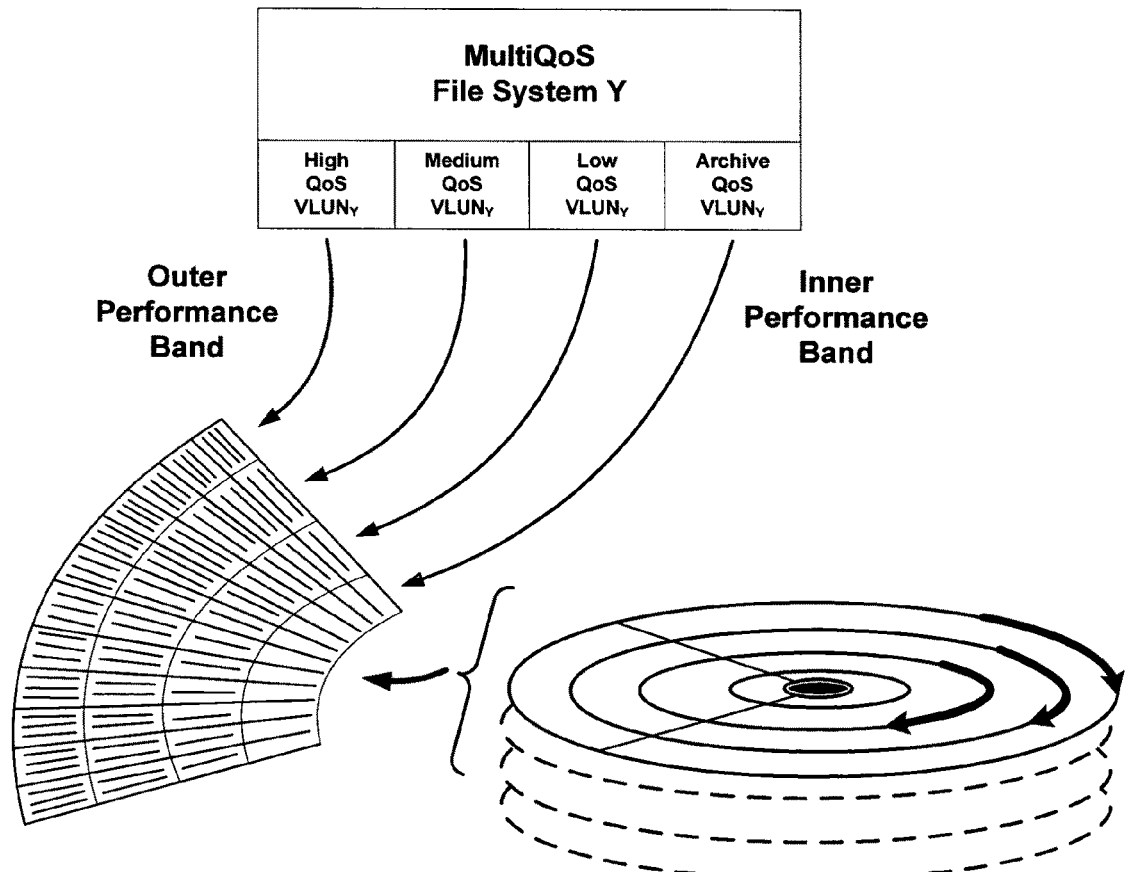
FIG. 11B illustrates a multiQoS file system, the associated VLUNs, and the performance bands of a storage device.

FIG. 11B is a high level view of the multiQoS file system Y and its VLUNs each coupled to a performance band of storage device(s). The management controller 110 configures the data storage system as described earlier so that the multiQoS VLUNs associate with corresponding performance bands of the storage devices.

Migrating Files to Different Qualities of Service

As time elapses from the initial creation of a file, the rules associated with the multiQoS file system may indicate that the file should move to a different QoS. For example, the rules might state that files not accessed in a month move to low QoS storage. Likewise, the rules might state that a file in low QoS storage should move to high QoS storage if modified. Alternatively, the IT administrator can manually direct the file system to migrate a file or set of files to a different QoS.

The file system discovers the need for a change in the QoS for a file by either an access to the file or by the file system scanning its files in a low priority background operation. In an alternative embodiment, a certain percent (e.g., 5%) of the total bandwidth of the data storage system can be reserved for scanning and/or migration. In either case, the file system triggers an activity to move the file to the desired QoS while maintaining access to the file and all other files in the file system. If the background activity of migration is run at a lower priority than production data it can be preempted as required. While production activity may continue while migration is in progress, migration rules may continue to be affected. It is suggested that, once begun, the migration of a file, an extent of a large file, or a large file be allowed to complete. Further, a recently migrated file or extent is prevented from migrating again until a reasonable time period has expired to prevent "thrashing" that is constant movement of files and extents back and forth between different QoS.

Figure 12:
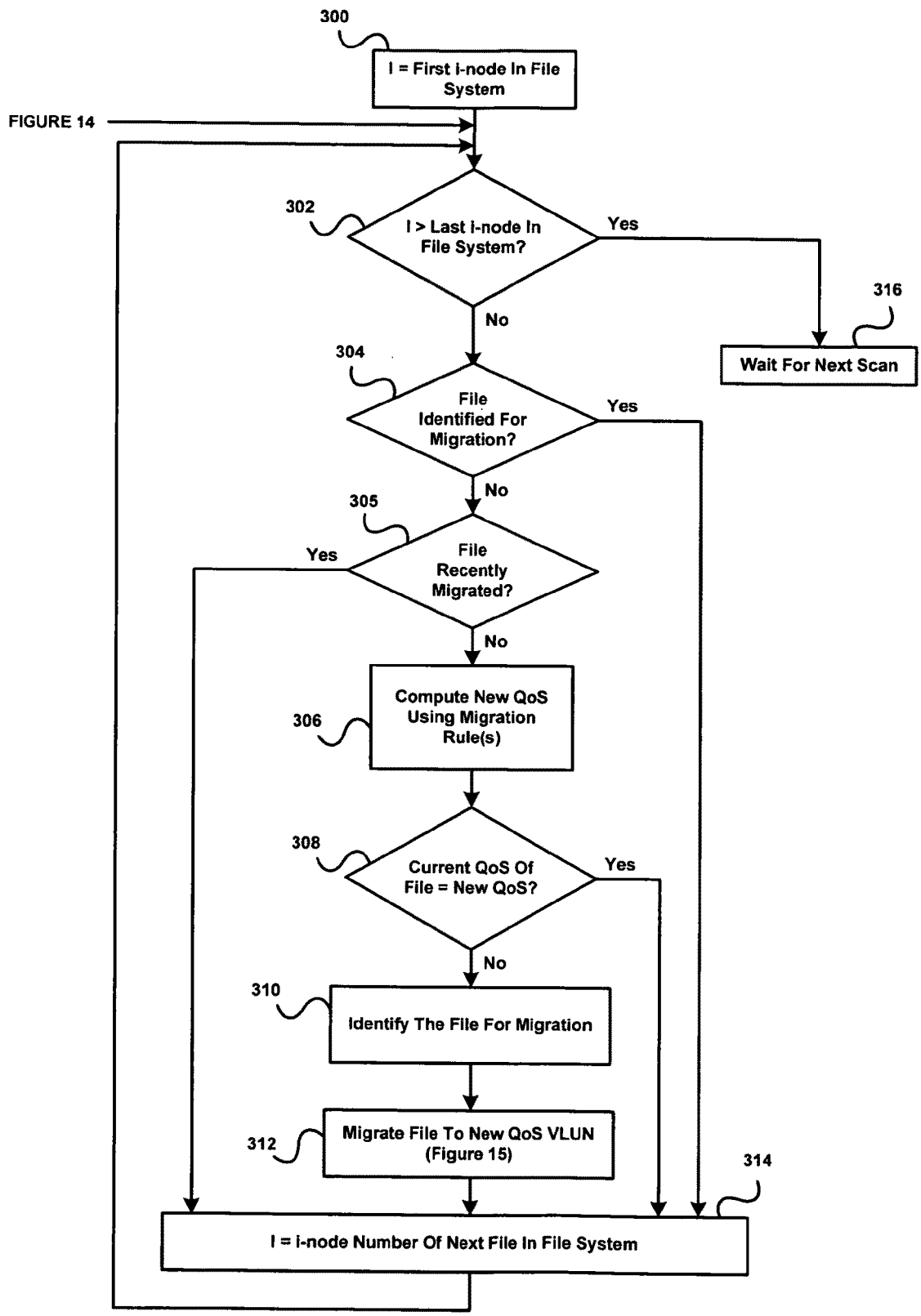
FIG. 12 illustrates a method of identifying files for migration between QoS levels.

FIG. 12 illustrates a method of identifying files for migration between different QoS. The host may run the method as a process based on a condition such as passage of a predetermined time period, a process priority, an amount of CPU recently consumed or the amount of time spent sleeping recently. Although the method is described serially below, the steps can be performed in parallel, for example, asynchronously or in a pipelined manner. There is no requirement the method be performed in the order shown except where indicated. Further, the steps are implemented by computer such as one or more host(s) described earlier. For brevity, we describe the methods as executed by a host.

Referring to step 300 of FIG. 12, the host assigns the first i-node of the multiQoS file system to a variable I. At step 302, the host tests if the variable I is greater than the last i-node in the file system. If the host has tested all the i-nodes, the method waits for the next scan of all the i-nodes of the multiQoS file system at step 316. The next scan may run as a background process, start after a predetermined time, or start when another condition is met. The condition can be based on the scan process's relative priority, recent consumption of CPU time for the scan process falls below a value, or the scan process has spent too much time sleeping recently.

Figure 15:
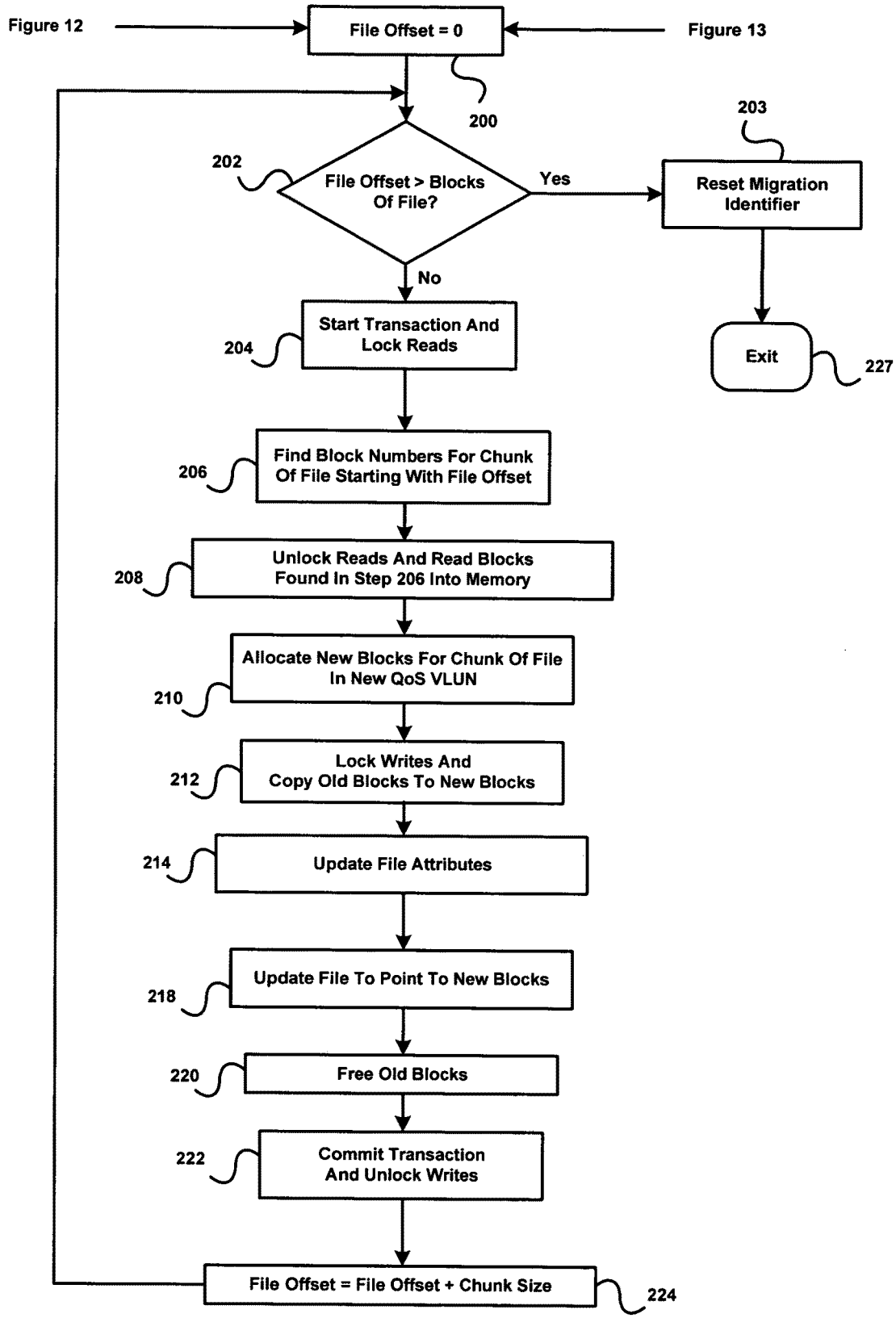
FIG. 15 illustrates a method of migration of a file between different QoS.

If the variable I is not greater than the last i-node at step 302, the host tests if the file of that i-node is identified for migration at step 304. The file is identified for migration in the file attributes, for example, by setting a migration identifier. If the file is not identified for migration, the host tests if the file was recently migrated at step 305. If so, the host proceeds to step 314, and if not, the host computes a new QoS for the file using the migration rule(s). In an embodiment, the host compares migration rule(s) to rule attribute(s) at step 306. In another embodiment, the host compares migration rule(s) to a value such as file size or capacity threshold at step 306. At step 308, the host tests if the current QoS equals the new QoS computed at step 306. If not, the host sets a migration identifier in the file attributes at step 310 to identify the file for migration. At step 312, the host migrates the file to the new QoS VLUN as illustrated in FIG. 15. In this embodiment, migration of each file is initiated without waiting for all i-nodes to be checked, that is, scanned. Returning to step 304, if the file is already identified for migration or being migrated, the host has already determined the QoS of the file, and therefore skips the steps 305-312 and proceeds to step 314. At step 314, the host assigns the i-node number of the next file to variable I to repeat the method for the next file at step 302.

Figure 13:
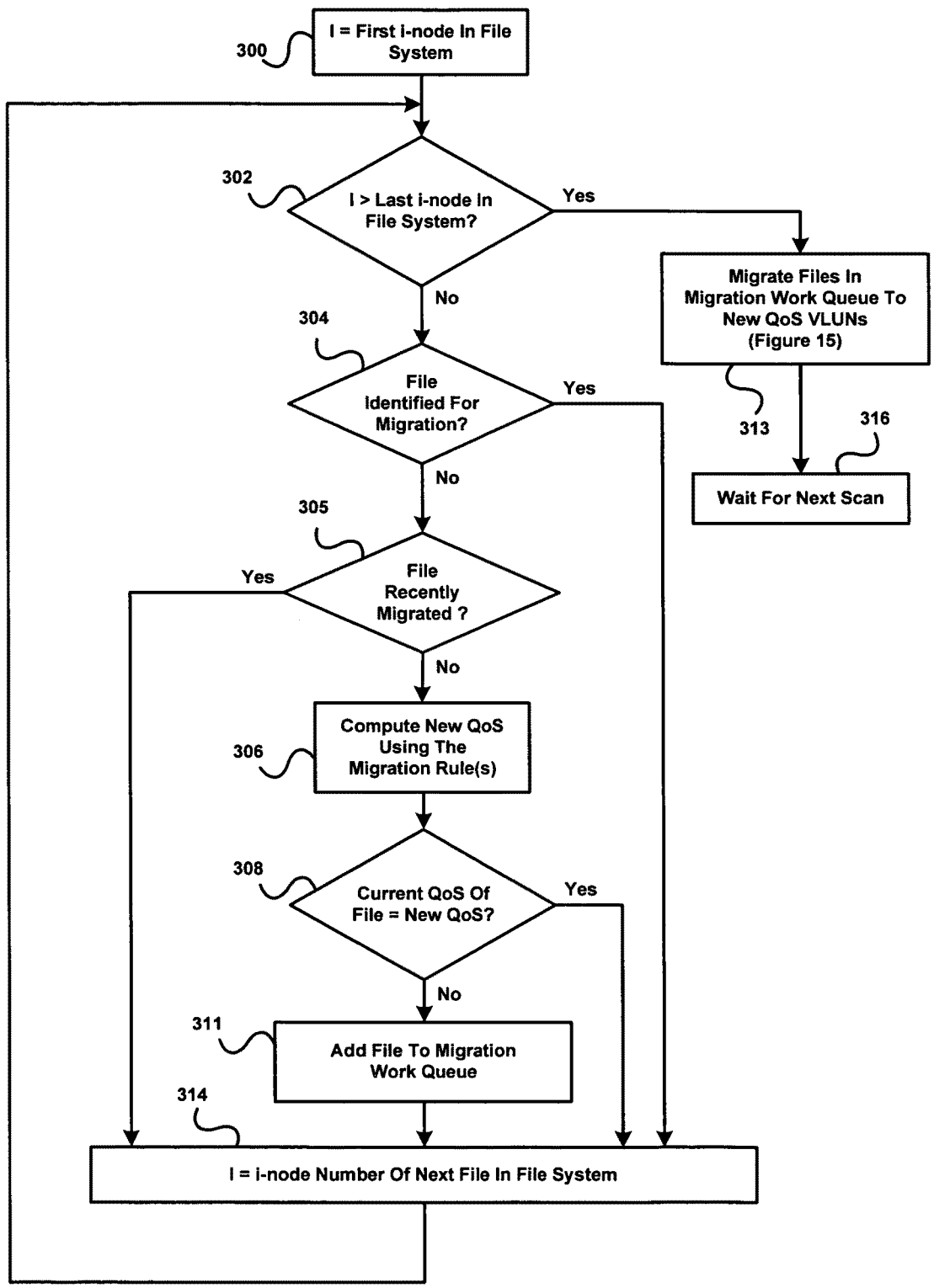
FIG. 13 illustrates another method of identifying files for migration between different QoS.

FIG. 13 illustrates another method of identifying files for migration between QoS. This method performs steps 300, 302, 304, 305, 306, 308, 314, and 316 described in connection with FIG. 12, but the host scans all the i-nodes of the file system before it migrates files identified and added to a migration work queue at step 311 for migration at step 313 to the new QoS VLUN as illustrated in FIG. 15. In an alternative embodiment, the method of scanning and the migration are decoupled from each other. In such an embodiment, the scan method adds to a migration work queue the files or extents identified for migration and the migration method reads from the migration work queue. The migration work queue may optionally be stored on nonvolatile storage devices (e.g., magnetic disk).

With regard to the method of scanning, the file system may use a B-tree to scan for files requiring migration where the leaf nodes are linked to siblings. The scan visits the first (i.e., leftmost) leaf node and follows the chain of links to the right to cover all the objects in the file system. As objects are added to and deleted from the B-tree, the B-tree needs to be rebalanced to ensure all the objects are the same distance from the root (i.e., the B-tree must treat all children the same). Rebalancing can change the sibling links that connect leaf nodes. To avoid interference with such rebalancing, a scan will place a lock on the B-tree to prevent modifications. However, holding a lock on the B-tree during the entire scan can impact production I/O.

In another embodiment, a method of scanning can be implemented to eliminate the need for holding a lock on the B-tree during the entire scan. The method yields the lock repeatedly during the scan for any rebalancing that might be pending.

Figure 17:
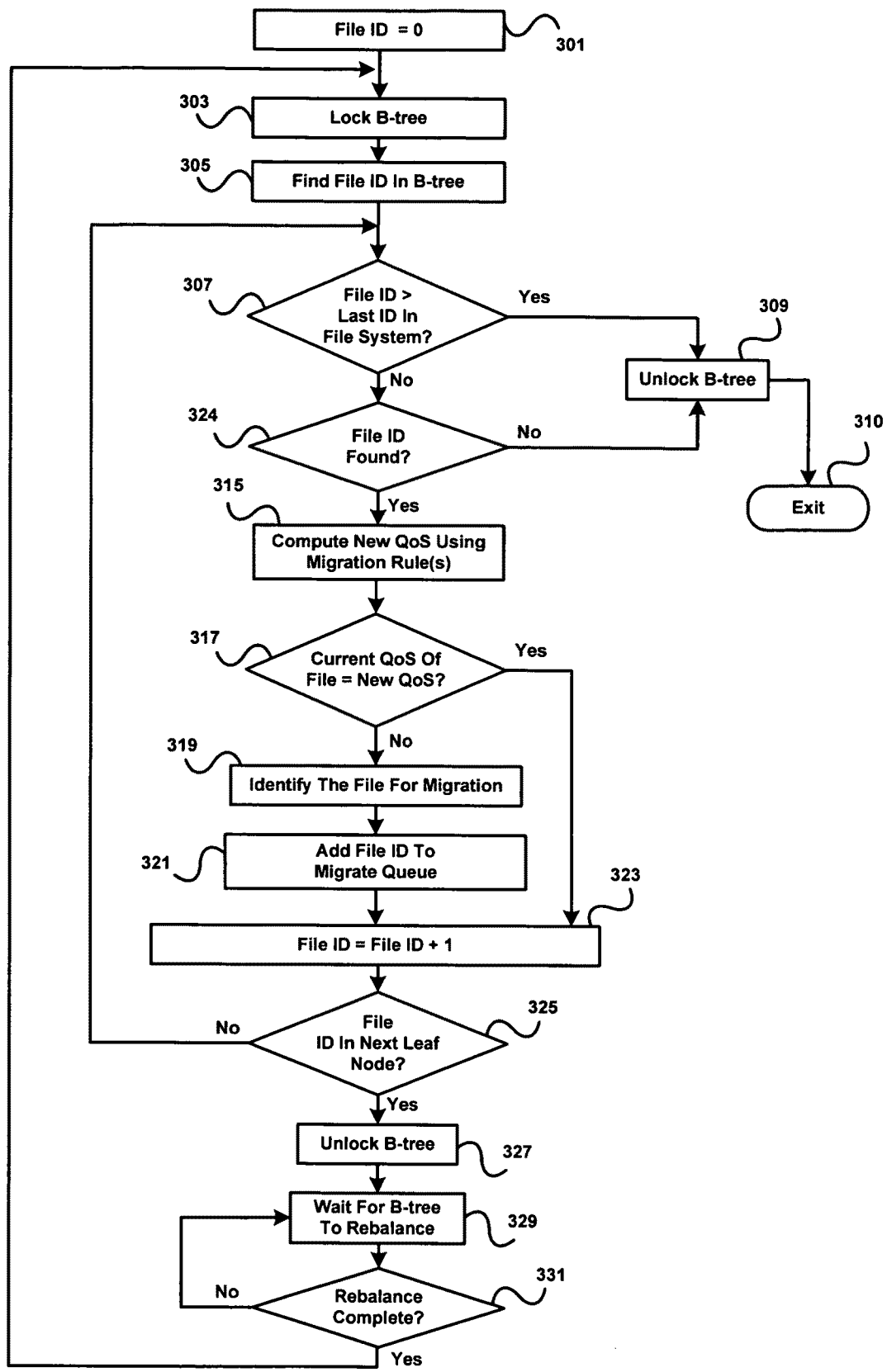
FIG. 17 illustrates another method of identifying files for migration.

Referring to step 301 of FIG. 17, the host sets the file ID to the lowest file ID (e.g., zero) in the file system. At step 303, the host places a B-tree lock to prevent rebalancing. At step 305, the host finds and reads the leaf block that contains the file ID.

At step 307, the host tests if the file ID is greater than the last file ID in the file system. If so, the host unlocks the B-tree at step 309 and exits the method at step 311. If not, the host tests if the file ID is found at step 324. If not found, the host again unlocks the B-tree at step 309 and exits the method at step 310. If found, the host computes the new QoS using the migration rule(s) at step 315. At step 317, the host tests if the current QoS of the file equals the new QoS. If so the host proceeds to increment the file ID at step 323. If not, the host identifies the file for migration at step 319, adds the file ID to the migrate queue at step 321, and increments the file ID at step 323. At step 325, the host tests if the file ID is in the next leaf node. If not, the host returns to step 307. If so, the host unlocks the B-tree at step 327, waits for the B-tree to rebalance at step 329, and tests if rebalance is complete at step 331. If not, the host returns to wait for the B-tree to rebalance at step 329. If so, the host returns to step 303 to lock the B-tree and repeat the method.

Figure 14:
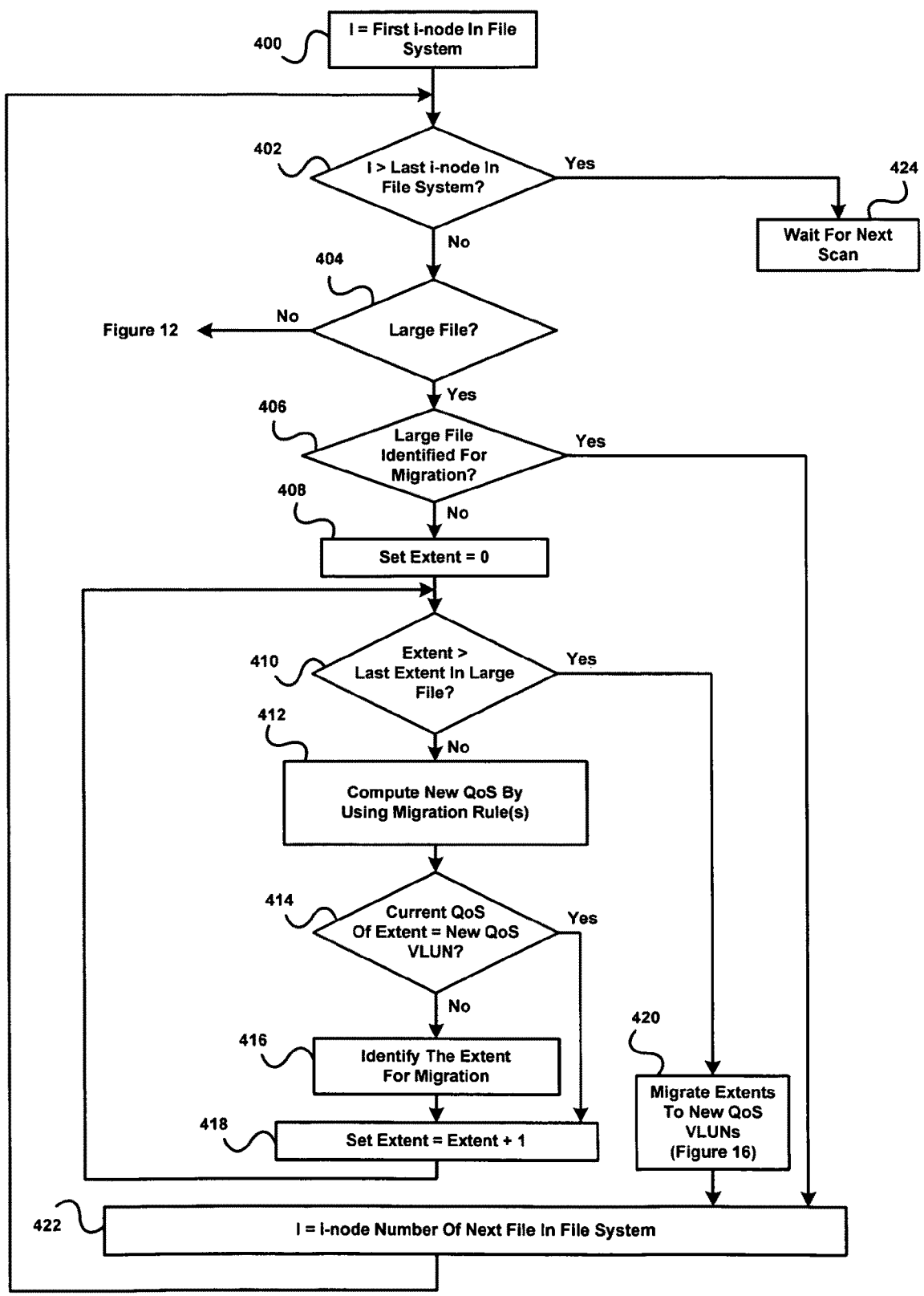
FIG. 14 illustrates a method of identifying extents for migration between different QoS.

FIG. 14 illustrates a method of identifying large files having extent attributes for migration between QoS. In general the host reads extent attributes as well as the file attributes, and manipulates and migrates each extent after its extent attributes meet the migration rule. Again, the host may run the method as a process based on the conditions mentioned earlier in connection with FIG. 12 or FIG. 13. Although the method is described serially below, the steps can be performed in parallel, for example, asynchronously or in a pipelined manner. Again, there is no requirement the method be performed in the order shown except where indicated, and again for brevity, we describe the methods as executed by a host.

Referring to step 400 of FIG. 14, the host assigns the first i-node of the multiQoS file system to a variable I. At step 402, the host tests if the variable I is greater than the last i-node in the file system. If so, the method waits for the next scan of all the i-nodes of the multiQoS file system at step 424. The next scan may run as a background process, start after a predetermined time, or start when another condition is met. The condition can be based on the scan process' relative priority, if recent consumption of CPU time for the scan process falls below a value, or if the scan process has spent too much time sleeping recently.

If the variable I is not greater than the last i-node at step 402, the host checks size of the file and/or the file attributes to determine if the file is a large file at step 404. If not, the host performs the method illustrated in FIG. 12. If it is a large file, the host checks if the large file is identified for migration at step 406. The large file is identified for migration in the file attributes, for example, by setting a migration identifier. If the file is not identified for migration, the host sets the extent equal to zero at step 408 and goes to step 410. At step 410, the host tests if the extent is greater than the last extent in the large file. If not, the host computes a new QoS by using the migration rule(s) at step 412. In an embodiment, the host computes the new QoS by comparing the migration rule(s) to one or more extent attributes at step 412. At step 414, the host reads the extent attributes to determine if the current QoS equals the new QoS computed at step 412. If not, the host identifies the extent for migration by, for example, setting a migration identifier in the extent attributes at step 416. At step 418, the host increments the value of the extent and loops back to step 410. Once the host determines that the extent being processed is greater than the last extent in the large file at step 410, the host performs the method of migration illustrated in FIG. 16. In an alternative embodiment, analogous to the method of FIG. 12, once the host sets the migration identifier in the extent attributes at step 416, the host migrates the extent to the new QoS VLUN without waiting for all the extents to be tested. In an alternative the scan and migration of extents is decoupled. Returning to step 406, if the large file is identified for migration, the host has already determined the QoS of the file, and therefore skips the steps 408-418 and proceeds to step 422. At step 422, the host assigns the i-node number of the next file in the file system to variable I and proceeds to step 402 and repeats the method of identification for the next i-node in the file system.

FIG. 15 illustrates a method of migration of a file between QoS. Generally, the file system first determines the new QoS for the file as described in connection with FIG. 12. The file system iterates through existing blocks of the file and allocates new blocks in the desired QoS. The blocks in each QoS contain an index in part of (e.g., the top bits) of their block address indicating the QoS. For each block in the file, the file system copies the data from the old blocks to new blocks, adjusts the file metadata to point to the new block and frees the old blocks. To reduce the space allocated concurrently, the file system allocates blocks in chunks at a time, such as 2 MB, copies the 2 MB of data, then frees the 2 MB of blocks in the old QoS.

The steps below can be performed in parallel and in a different order as long as it results in migration of a file between QoS. Referring to step 200 of FIG. 15, the host sets the file offset (i.e., the number of blocks into a file) to zero. At step 202, the host tests if the file offset is greater than the total number of blocks of the file. If so, the host has completed the method of migration, resets the migration identifier at step 203, and exits the method at step 227. If not, the host starts a transaction and locks the file for reading at step 204. The read lock regulates concurrent access, allowing reads but not writes to the file. At step 206, the host finds the block addresses for a chunk of the file starting with the file offset. At step 208, the host unlocks the read lock and reads the blocks found in step 206, into host memory. At step 210, the host allocates new blocks for the chunk of the file in the new QoS VLUN. At step 212, the host places a write lock on the file that prevents both reads and writes to the file by anyone other than the host, and copies the old blocks to the new blocks. At step 214, the host updates the file attributes (e.g., the rule attribute(s) and the new QoS). At step 218, the host updates the block addresses. At step 220, the host puts the old blocks on the free list, making them available for use to other programs, etc. At step 222, the host commits the transaction and unlocks writes. Finally, at step 224 the host adds the file offset to the chunk size to get the new value of file offset, and returns to the test at step 202.

Alternatively, the host can allocate at the outset the entire space required for a file (or extent) identified for migration on the target VLUN. This provides a contiguous allocation of blocks, that is, less fragmentation of the migrated file (or extent).

Figure 16:
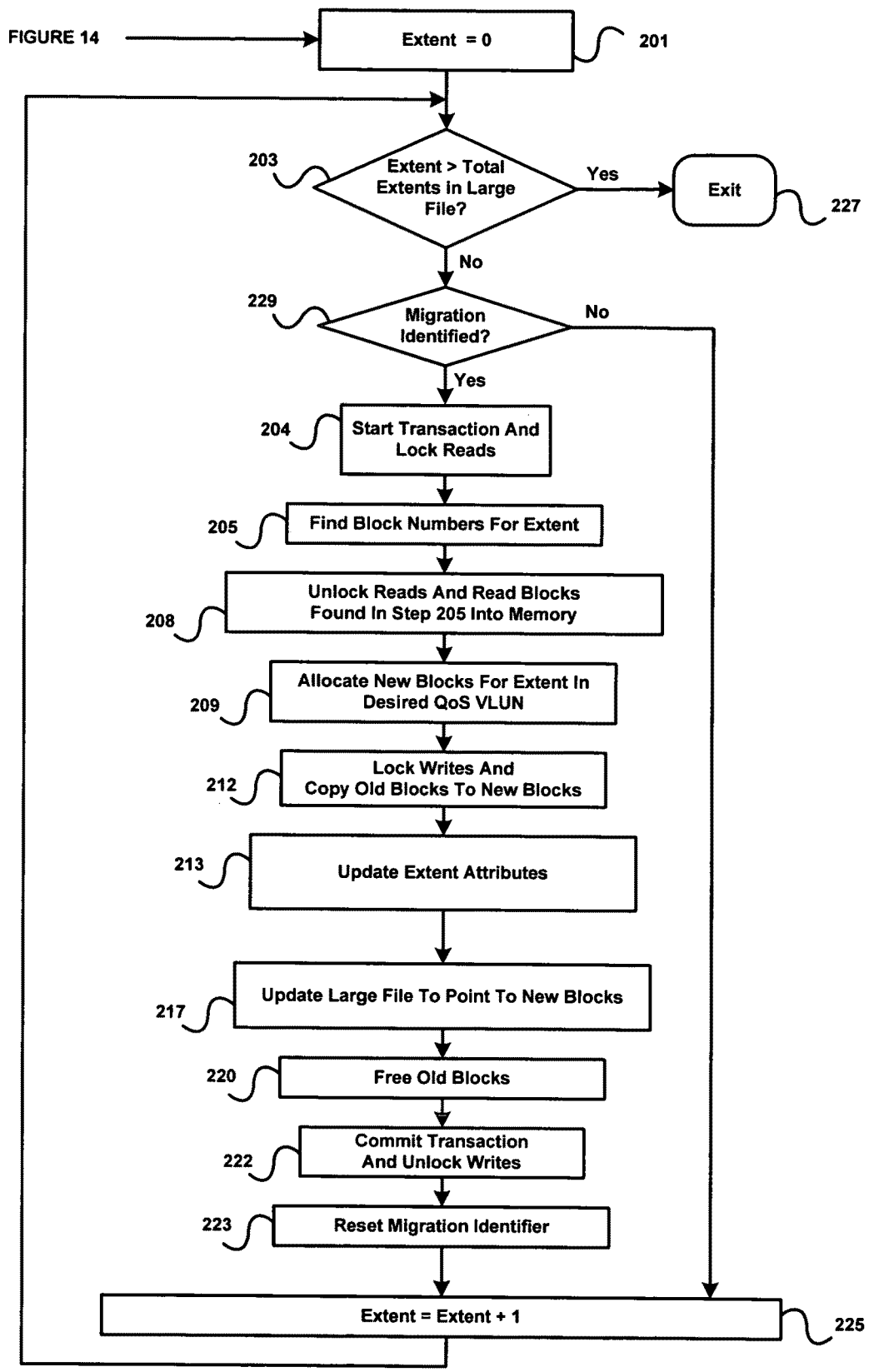
FIG. 16 illustrates a method of migration of extents between different QoS.

FIG. 16 illustrates a method of migration of an extent between QoS. Generally, the file system first determines the new QoS for the file as described in connection with FIG. 14. The file system iterates through the existing blocks of the file and allocates new blocks in the desired QoS. The block addresses at each QoS may contain an index in the top bits of their address indicating the QoS. For each block in the file, the file system copies the data from the old block to the new block, adjusts the metadata description of the file to point to the new block, and frees the old block. To reduce the amount of space allocated concurrently, the file system allocates blocks in small chunks at a time, such as 2 MB, copies the 2 MB of data, then frees the 2 MB of blocks in the old QoS.

The steps below can be performed in parallel and in a different order as long as it results in migration of a file between QoS. Referring to step 201 of FIG. 16, the host sets the extent equal to zero. At step 207, the host tests if the extent is greater than the total number of extents in the large file. If so, the host has completed the method of migration, exits the method at step 227. If not, the host tests if the migration identifier is set at step 229. If not, the host proceeds to step 225. If so, the host begins a transaction and places a read lock on the file at step 204. The read lock regulates concurrent access, allowing reads but not writes to the file. At step 205, the host finds the block addresses for the extent starting with the extent=0. At step 208, the host unlocks the read lock and reads the blocks found in step 205 into the host memory. At step 209, the host allocates new blocks for the extent in the desired QoS VLUN. At step 212, the host places a write lock on the file that prevents both reads and writes to the file by anyone other than the host, and copies the old blocks to the new blocks. At step 213, the host updates the extent attributes to the new QoS. At step 217, the host updates the large file to point to the new blocks. At step 220, the host puts the old blocks on the free list. At step 222, the host commits the transaction and unlocks writes. At step 223, the host resets the migration identifier of the extent. Finally, at step 225 the host increments the extent and loops back to the test at step 203. As an alternative, at step 420 of FIG. 14, the extents identified for migration may be added to a migrate queue to be picked up for migration by the method of FIG. 16.

In an embodiment, if the underlying multiQoS file system supports snapshots, the file system that migrates data to a different QoS migrates the blocks for all snapshots sharing the latest version of the data rather than allocating a whole new copy of the data as copy-on-write snapshots usually require.

While migrating a file to a different QoS, the file system may not have enough space in the new QoS to perform the migration. In that case, the file system sends an alert to trigger automatic expansion of the VLUN associated with the QoS or to notify of the space constraint.

Additional Access Patterns

As described above, a multiQoS file system uses the access time information available from file attributes to choose QoS. In an embodiment, a multiQoS file system tracks additional access information to avoid overreacting to stray references to files. For example, a multiQoS file system can associate an additional 32-bits to track reads and an additional 32-bits to track writes in the i-node information for each file. Each bit in these new fields corresponds to one day of access. The least significant bit corresponds to the day of the most recent access as indicated in the current i-node fields "atime" (read time), "mtime" (write time), or "crtime" (create time). The next bit corresponds to access of a day prior to the most recent access, and so on. Each 32-bit field shows accesses for approximately one month. In another example of access pattern tracking, a multiQoS file system can have rules such as accessed five days in a row or accessed four times in the last month.

Alternatively, the access pattern records may not be stored in the i-node, and instead may be stored in a system file or files. The system file or files will be indexed by the i-node. These system files are not visible to end-user and used by the file system.

Alternatively, the access pattern record of a file may be stored as an object in the B-tree that contains all the file system objects. The object ID for the access pattern record for a file would be associated with the file's i-node or be calculated from the file's object ID by replacing the type ID from type=i-node to type=access record.

Changing QoS Rules in a MultiQoS File System

After creating a multiQoS file system, the IT administrator may need to change the rules controlling the selection of QoS. For example, the IT administrator may add a new QoS to a multiQoS file system and need to add or change rules to make use of the new level.

After modifying the rules associated with a multiQoS file system, the existing files may no longer have the desired QoS. The file system determines the correct QoS for each file when accessed or scanned using the new rules and migrates the file if needed.

Migrating From a VLUN in a MultiQoS File System

An IT administrator may need to move the data of a multiQoS file system off a VLUN. For example, a VLUN may become badly fragmented or may be allocated on data storage subsystems that need to be removed from the data storage system. If the IT administrator wishes to remove a QoS from a multiQoS file system, he can change the rules so that no rule permits use of the obsolete QoS. After the file system has completely swept the multiQoS file system and migrated all files away from the obsolete QoS, the management software can detach the obsolete VLUN from the file system and delete the VLUN. In an embodiment, the IT administrator can create a replacement VLUN for an existing QoS in a multiQoS file system and migrate all files with blocks on the obsolete VLUN to the new VLUN.

Synthetic Namespace Views

A multiQoS file system provides a uniform view of the files as a single set to the IT administrator who may want to see which files the system has stored at each QoS. The multiQoS file system provides special subdirectories with names like ".lowqos" and ".highqos" that show the files stored at particular QoS. At any directory level, listing the contents of ".lowqos" shows only the files in the directory level assigned to the low QoS. To implement the special directories in stateless protocols like the NFS, the multiQoS file system adds the desired QoS to some unused field in the NFS file handle for the directory of interest. For example, the file handle for the directory "/a/b/c.highqos" lists only the files in "/a/b/c" with high QoS. The multiQoS file system synthesizes a file handle for "/a/b/c/.highqos" using the file handle for the directory "/a/b/c" and with the new field in the file handle stating that the user wants only high priority files.

The multiQoS directory reading functions (corresponding to the NFS operations READDIR and READDIRPLUS) use the new field in the file handle for a directory and if not set, return all the files in the directory and if set, return only the files for the desired QoS. Brent Callaghan, *NFS Illustrated* (2000) describes the details of NFS and is incorporated herein by reference. In an embodiment, the multiQoS file system does not show the special directories.

A large file that has blocks in different QoS VLUNs will appear in all the synthetic QoS folders. This is implemented by tracking all the QoS levels used by the file in its i-node. In an embodiment, this is a bitmap with each bit corresponding to a QoS level. The IT administrator can specify rules in the UI using various file's attributes including: the size of the file, the time since the file's creation, the time since any user read the file, the time since any user modified the file, the owner of the file, the folder or directory containing the file, and the amount of free space in each QoS allocated to the file system.

The IT administrator rules can be combined to develop additional rules. For example, a rule may specify ".mp3" files go to low priority storage, and all other files created, read, or modified in the last month to high priority storage. The rules can select different qualities of service for user data as opposed to file system metadata (e.g., directories, indirect blocks, and i-nodes). IT administrators may save a set of rules so they can use them on many multiQoS file systems to enforce uniform policies.

FIG. 18 illustrates the management client 112 shown in FIG. 1 may run a Web-based GUI in a browser (e.g., Microsoft Internet Explorer or Firefox) to display the high level choices available to configure the data storage system 100, while the management controller 110 communicates the high level choices in web forms using the HTTP over link 172 to the management client 112. The management client 112 shown allows an IT administrator to configure each volume by selecting: (1) NAS or SAN, (2) a capacity, and (3) a priority (e.g., high, medium, low, or archive).

Figure 19:
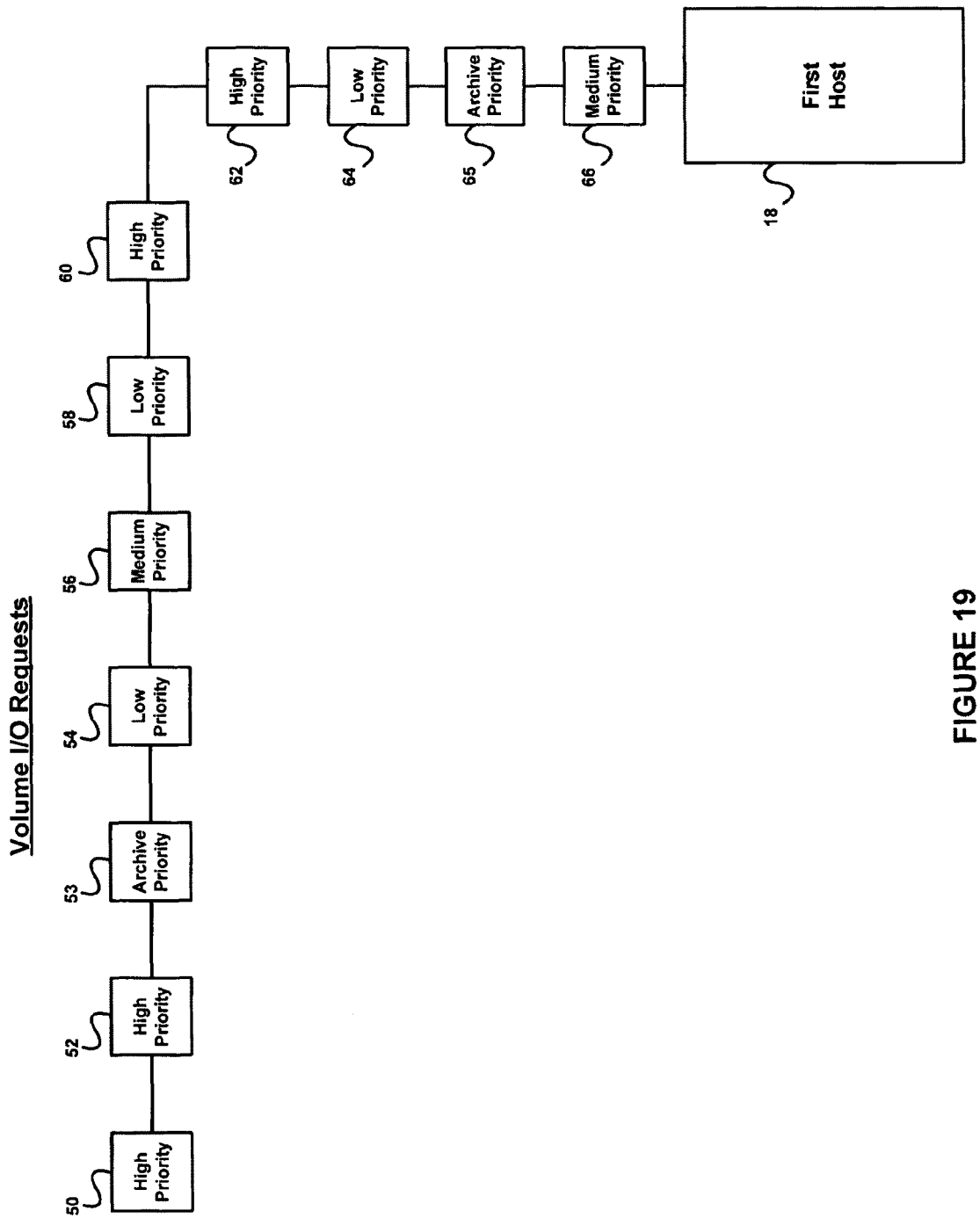
FIG. 19 illustrates I/O requests arriving in arbitrary order at a host.

FIG. 19 illustrates that the first host 18 receives I/O requests from users in no particular order. Each I/O request associates with a configured volume. As illustrated, the users of the data storage system have transmitted the following I/O requests to the first host 18:

1) a medium priority I/O request 66,
2) an archive priority I/O request 65,
3) a low priority I/O request 64,
4) a high priority I/O request 62,
5) a high priority I/O request 60,
6) a low priority I/O request 58,
7) a medium priority I/O request 56,
8) a low priority I/O request 54,
9) an archive priority I/O request 53,
10) a high priority I/O request 52, and
11) a high priority I/O request 50.

Figure 20:
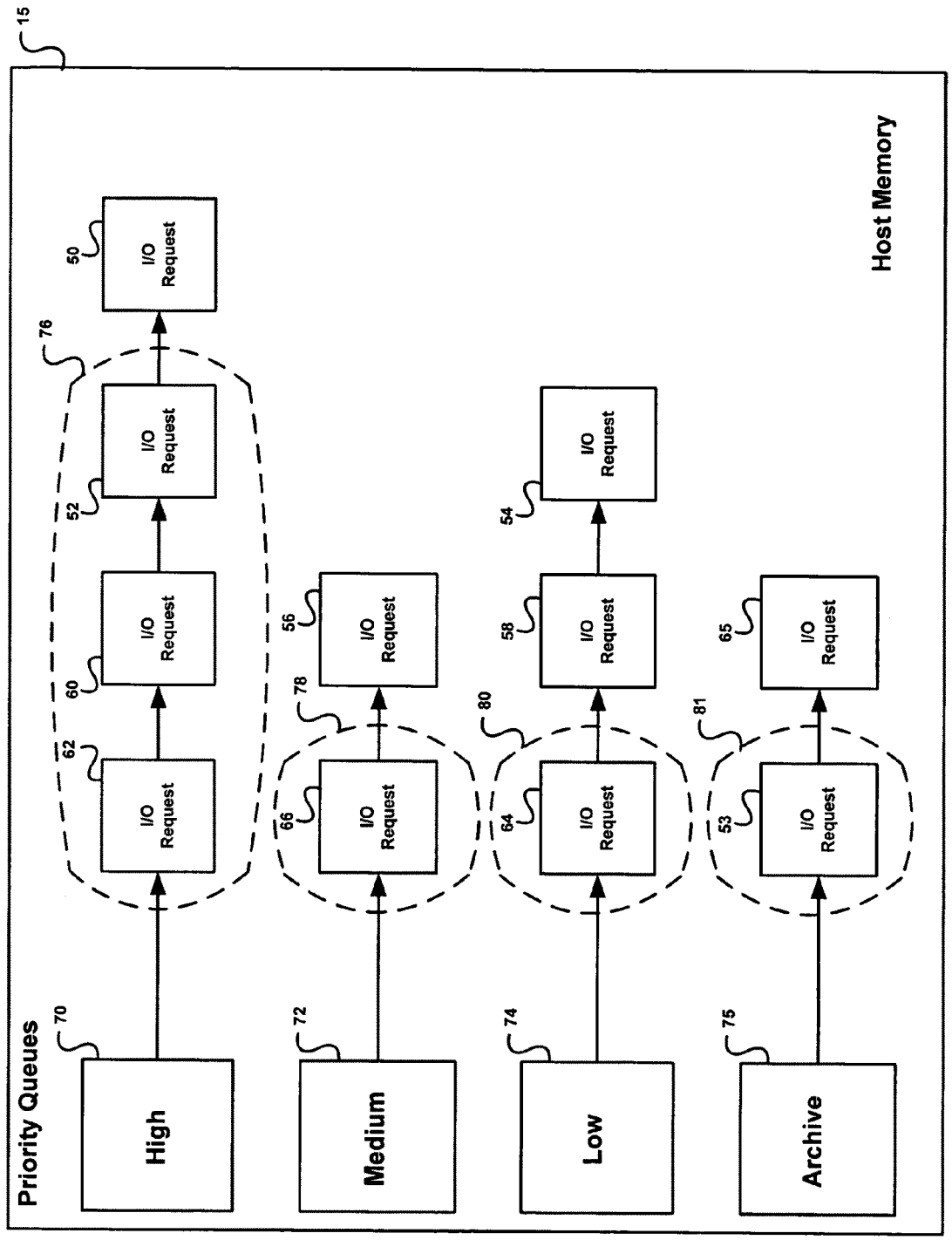
FIG. 20 illustrates I/O requests in high, medium, low, and archive priority queues in the host.

FIG. 20 illustrates the host determines the volume priority of each incoming I/O request and arranges the I/O requests in the host memory into priority queues. FIG. 20 depicts two to four I/O requests in each queue, but each queue may have more or less I/O requests. The host is shown having high, medium, low, and archive priority queues, but users' requirements may require a higher or lower number of priorities, and use other terminology. FIG. 4 depicts high priority I/O requests 50, 52, 60, 62 go into the high priority queue, medium priority I/O requests 56 and 66 go into the medium priority queue, low priority I/O requests 54, 58, and 64 go into the low priority queue, and archive priority I/O requests 53 and 65 go into the archive priority queue.

The host includes an I/O scheduler that periodically sweeps through the I/O request queues to pick up new I/O requests to send to the data storage subsystems 44, 46, or 48 (FIG. 1). In an embodiment, the data storage subsystems send an acknowledgment to the host to indicate availability for processing the new I/O requests. The I/O scheduler selects I/O requests from each priority's queue according to the table that follows. For example, if the I/O scheduler is ready to process additional I/O requests, it preferentially selects higher priority I/O requests as indicated by dotted line 76, and an I/O request from each of the medium, low, and archive priority queues as indicated by, respectively, dotted lines 78, 80, and 81. In a normally loaded data storage system, there is often more I/O requests queued and the I/O scheduler selects more I/O requests on each sweep through the queues.

The I/O scheduler looks up the volume priority of each I/O request in a table and tags each I/O request with its priority and transmits the I/O requests in batches to the data storage subsystems in order of priority. In an embodiment, the priority of each I/O request is set in a bit field. The width of the bit field determines the possible levels of priority. In an embodiment, the bit field is a command descriptor block (CDB) of a SCSI command and the three-bit field of the CDB represents up to eight priorities.

Figure 21:
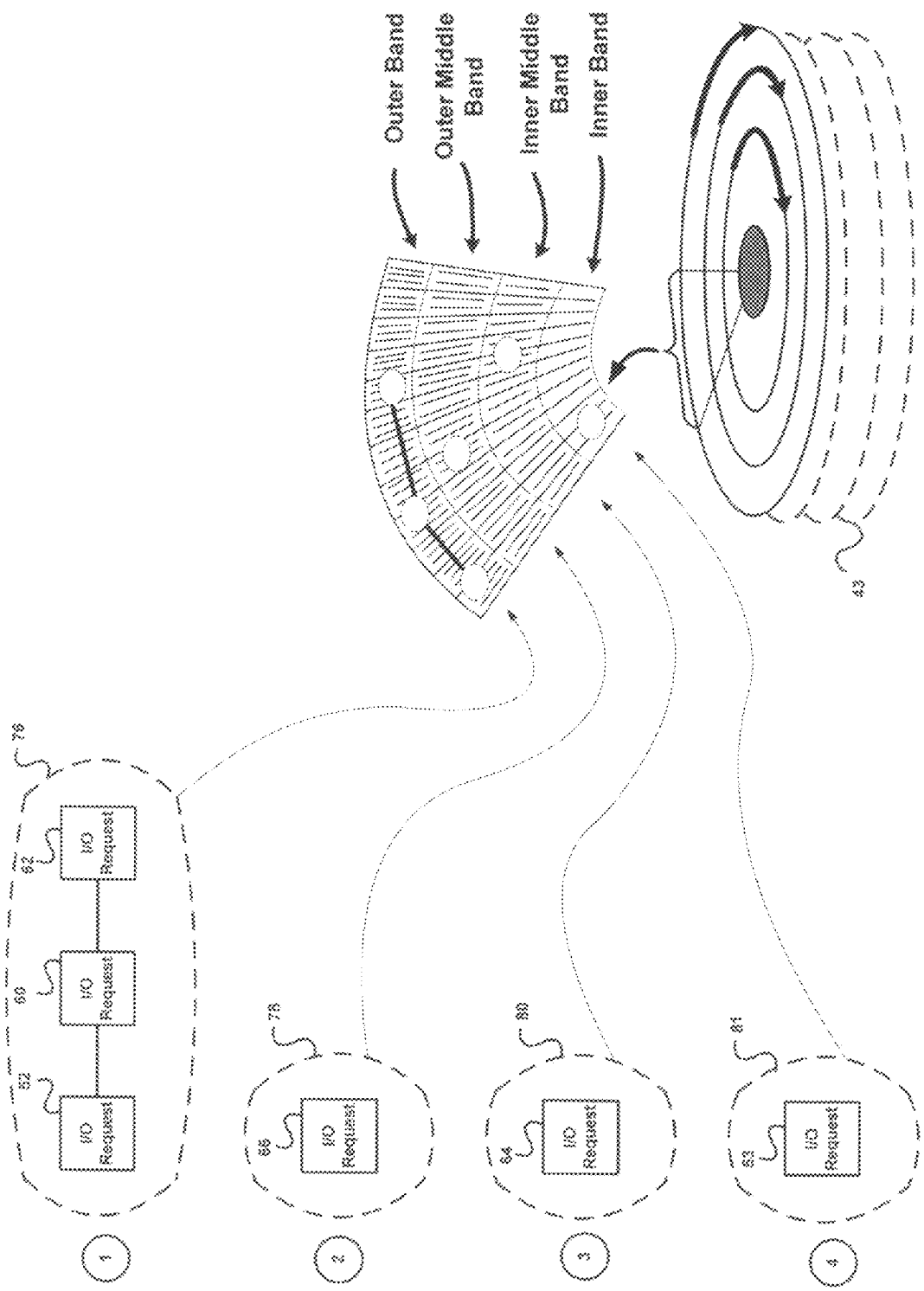
FIG. 21 illustrates high, medium, low, and archive priority I/O requests arranged in the performance bands of a disk drive.

As illustrated by FIGS. 1 and 21, the host sends a batch 76 of high priority I/O requests 52, 60, and 62 to the data storage subsystem 44. Once received, the array controller 42 processes the high priority batch by accessing a high performance band of a storage device such as the outermost band of at least one disk drive of disk array 43. Next, the host sends medium priority I/O request 78, low priority I/O request 80, and archive priority I/O request 81 to the data storage subsystem 44. Again, the array controller 42 processes the I/O requests according to performance bands, for example, by accessing, respectively, the outer middle band, the inner middle band, and the inner band of the disk drive(s).

In another embodiment, each data storage subsystem uses the techniques described in U.S. application Ser. No. 10/976,430, Management of I/O Operations in Data Storage Systems, filed on Oct. 29, 2004 to retain the priority ordering of I/O requests to the storage devices (e.g., disk drives). Therefore, the storage devices preferentially service the high priority requests over medium priority requests. Likewise, the storage devices preferentially service the medium priority requests over low priority requests and so forth. The data storage subsystem uses this ordering to minimize seek between the performance bands of the storage device.

In another embodiment, within each priority, the data storage subsystem sorts the I/O requests according to known disk drive arm scheduling algorithms to reduce seek time. In an embodiment, at the end of a cycle of priority work, the data storage subsystem seeks the disks back to their outer diameters to perform or to be ready to perform high priority requests again.

Figure 22:
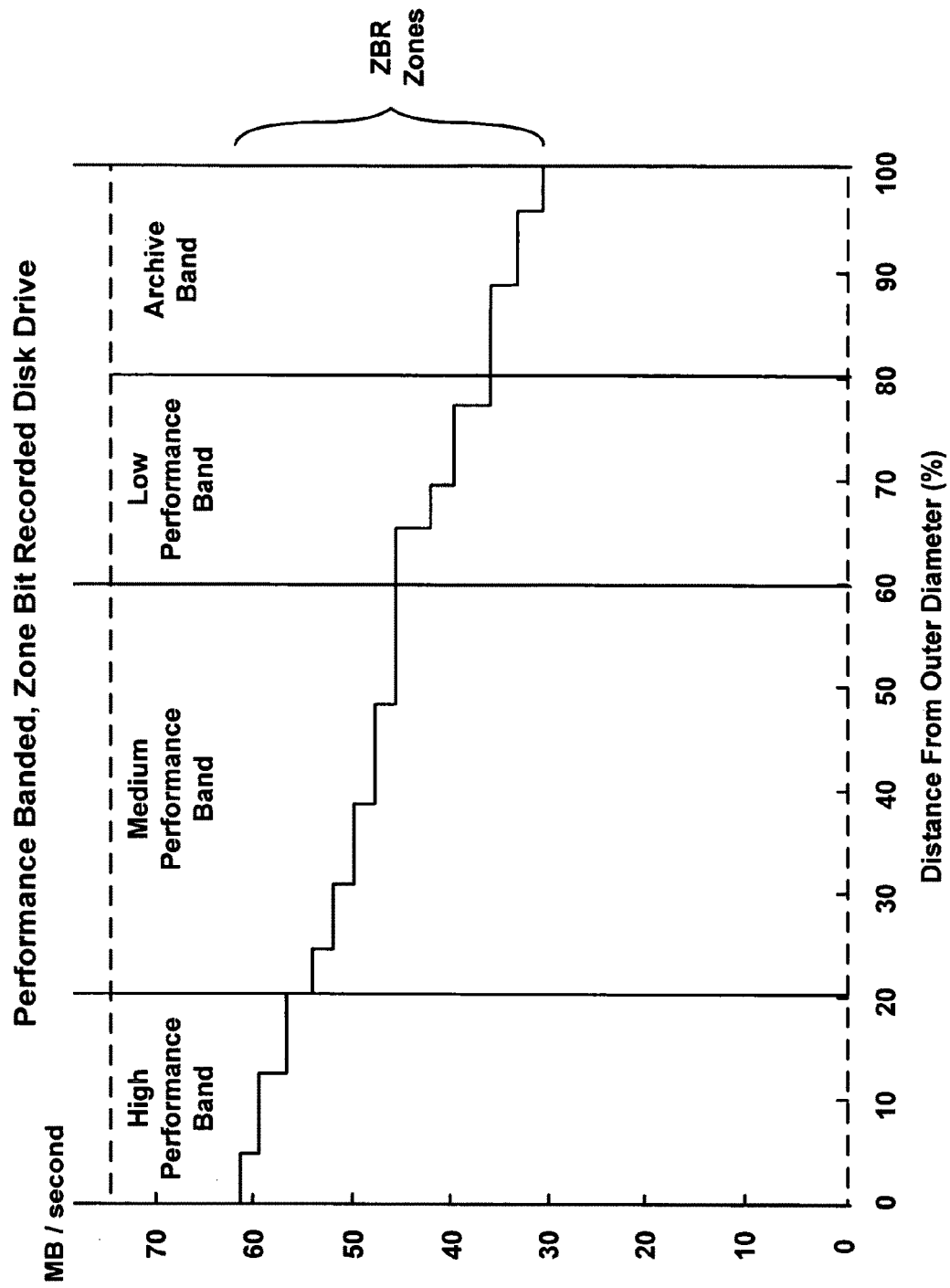
FIG. 22 shows high, medium, low, and archive performance bands with respect to hard disk drive data rate as a function of track placement across the disk drive.

Thus, the invention takes advantage of performance characteristics of disk drive geometry. For sequential I/O, a disk drive can read or write from the outer diameter approximately twice as fast as it can read or write from the inner diameter. Disk drives store more data per track at the outer diameter and run at a constant rotational velocity; therefore, the data rate scales with the track capacity. FIG. 22 illustrates how the performance bands can be arranged on a curve showing sequential read data rate on a disk from outer to inner diameter. A performance band is a contiguous collection of data zones. The performance band can align or not align with data zone boundaries. In many embodiments, we illustrate the invention with four performance bands (e.g., high, medium, low, or archive). However, the number of performance bands can be two or more depending on the user requirements. Thus, the invention encompasses a plurality of performance bands.

For random I/O, a disk drive reads or writes about 8% faster at the outer diameter than at the inner. Applications can achieve yet higher random I/O rates by confining access to a small portion of the disk drive. For example, confining access to 5% of a disk drive can produce 1.6 times the random I/O throughput as using the entire disk drive. Generally, seek times on disk drives increase with the square root of the seek distance. By keeping the seek distance low, a data storage system improves random I/O performance.

With regard to quality of service I/O scheduling, to retain the high performance of the outer bands of the disk drives, the data storage system limits or eliminates seek activity to the other performance bands. The data storage system schedules I/O requests according to priority to enforce the allocation of I/O bandwidth selected by the administrator. To achieve the objectives, the data storage system queues I/O requests by priority and selects I/O requests to send to the data storage subsystems according to target percentages of use. The table below lists some illustrative priorities and desired allocation of I/O requests to each priority:

| Priority of I/O Request | Band of Disk Drive | % of I/O |
|---|---|---|
| High | Outer 20% | 50 |
| Medium | 20% to 60% | 35 |
| Low | 60% to 80% | 10 |
| Archive | Inner 20% | 5 |

The "band of disk drive" column represents the allocation of capacity on each disk drive. The outermost 20% of the disk drive goes to high priority, the next 40% goes to medium priority, and so forth. It should be understood that the number of priorities, the proportion of the disk allocated, and the percentage of I/O allocated will vary from user to user. For example, the number of priorities can be a plurality, that is, two or more. It depends on types of application, the performance requirements of the applications, and the frequency of use of the applications. Thus, the user should be able to add or delete a priority, change the portions of the disk dedicated to a priority, and the percent of I/O after operations reveal better configurations.

The data storage subsystems address the performance bands through logical block addresses (or LBAs) of the disk drives. LBAs on a disk drive start at zero on the outer diameter and increase up to the capacity of the disk drive, with the highest LBA on the inner diameter of the disk drive. Therefore performance bands correspond to ranges of LBAs on the disk drives.

The "% of I/O" column represents the minimum fraction of the I/O requests that the priority gets. For example, if the data storage system needs to gather 100 I/O requests, then it takes at least 50 high priority requests (if it has that many), 35 medium priority requests, and so forth. In order to not "hang" the host while waiting for sufficient I/O requests to match each of the prescribed % allocations, system timers allow the execution of accumulated I/O requests after reasonable wait periods. The host transmits the I/O requests to the data storage subsystem when the I/O requests meet the batch size but if the I/O requests count does not reach the batch size by a maximum dwell time, the host transmits I/O requests to the data storage subsystem to avoid delay.

The host can also weight the allocation of I/O requests to priorities by the number of volumes assigned to each priority. For example, if high priority is 50% and archive priority 5% of I/O bandwidth, and you have one high priority volume and 20 volumes of archive priority, the host will weight the allocation as follows:

High: 50%×1 volume=50%

Archive: 5%×20 volumes=100%

Total=150%

Normalizing the results you have as follows:

High: 50/150=33.3%

Archive: 100/150=66.7%

In another embodiment, the host may weight the allocation of I/O requests only to volumes that are recently active (e.g., I/O requests received in the last five minutes) in each priority. Each host receives I/O requests from users running applications and translates I/O requests to read or write blocks in a volume into I/O requests to blocks in the data storage subsystems. In an illustrative embodiment, each translated I/O request contains:

| Field | Data Type | Meaning |
|---|---|---|
| Enclosure LUN | 48-bits | World-wide name of target enclosure LUN |
| LBA | 64-bits | Logical block address in the LUN |
| Length | 32-bits | Number of 512-byte blocks |
| Operations | 32-bits | Read, write, or status inquiry |
| Buffer | 64-bits | Physical address of the data in host memory |
| Priority | 8-bits | Priority (high, medium, low, or archive) |

Figure 23:
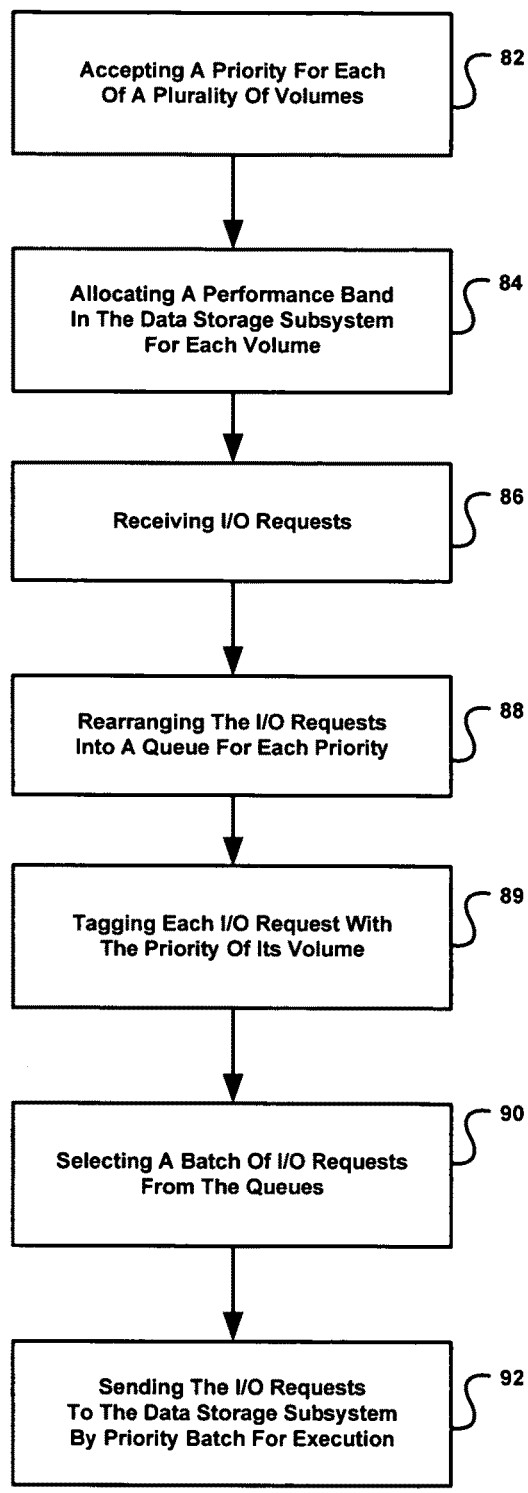
FIG. 23 illustrates a method implemented in a data storage system to handle I/O requests in accordance with quality of service priorities.

FIG. 23 illustrates a method of processing I/O requests in a data storage system. At step 82, the management client presents a user interface (e.g., FIG. 2) such as a Web form for accepting a priority for each of a plurality of volumes. The Web form can accept and pass the volume definition as parameters using HTTP to the management controller. At step 84, the host allocates a plurality of performance bands according to the priorities as described earlier. For example, the host will allocate a range of LBA that correspond to each performance band of a hard disk drive. At step 86, the host receives I/O requests in arbitrary order, and rearranges the I/O requests into a queue for each priority at step 88. At step 89, the host tags I/O requests by priority. At step 90, the host selects a batch of I/O requests from the queues. At step 92, the host sends the batch of I/O requests to a data storage subsystem for execution.

Figure 24:
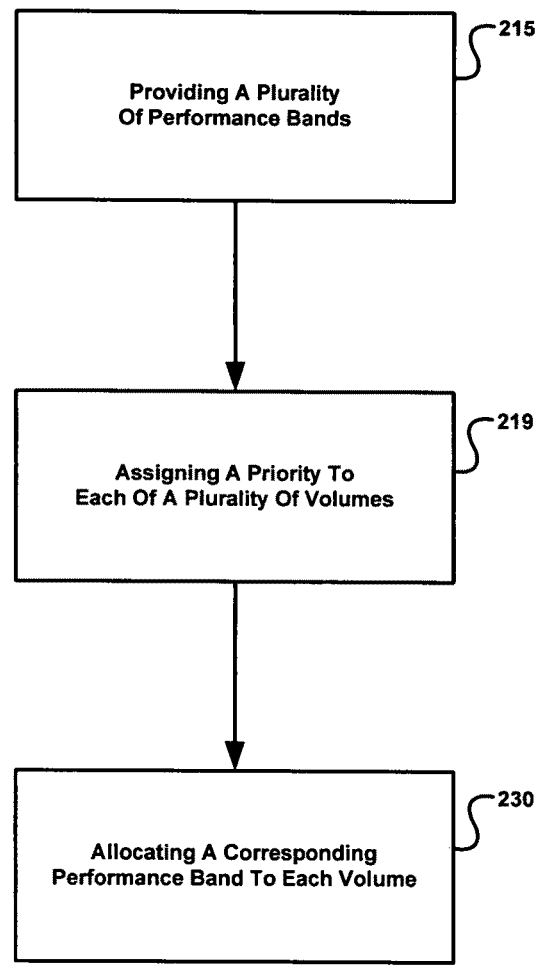
FIG. 24 illustrates a method of allocating performance bands to a data zone bit recorded disk drive of a data storage system.

FIG. 24 illustrates a method of allocating performance bands to a data zone bit recorded disk drive of a data storage system. At step 215, the host provides a plurality of performance bands in the data zone bit recorded disk. At step 219, the host assigns a priority to each of a plurality of volumes in the data storage system. At step 230, the host allocates a corresponding performance band to each volume.

In conclusion, many features of the invention were illustrated using the terms high, medium, low, and archive. The terms are not essential to the invention and other names can be used. The terms are only intended to distinguish the priority of the volumes, I/O requests, queues, and performance bands, not to supply a numerical limit or suggest that the priorities could not be identified with other terms.

The invention claimed is:

1. A multiQoS file system coupled to a host, comprising:
   a multiple quality of service (multiQoS) file system including data blocks, wherein a first portion of the data blocks is stored in a first quality of service virtual logical unit number (QoS VLUN) and a second portion of the data blocks is stored in a second QoS VLUN, the first QoS VLUN being coupled to a first performance band of a plurality of performance bands allocated on contiguous data zones of a disk drive, the second QoS VLUN being coupled to a second performance band of the plurality of performance bands allocated on contiguous data zones of the disk drive, and the multiQoS file system further including a file having an attribute, a current quality of service (QoS), and a set of data blocks of the first portion of data blocks; and
   a host coupled to the multiQoS file system adapted to:
   prioritize input/output (I/O) requests to the first performance band relative to at least the second of the plurality of performance bands;
   receive a migration rule,
   compute a new QoS of the file by comparing the migration rule to the attribute,
   migrate the set of data blocks of the file from the first QoS VLUN to the second QoS VLUN according to the new QoS; and update the current QoS to the new QoS for the set of data blocks.

2. The multiQoS file system of claim 1, wherein each data block has a logical block address that includes bits to encode a QoS and bits to address the data block.

3. The multiQoS file system of claim 1, wherein the host is further adapted to set the migration flag when the current QoS and new QoS are not equal.

4. The multiQoS file system of claim 1, wherein the migration rule uses a value associated with a capacity of the current QoS VLUN, a file activity, a file size, or a file type.

5. The multiQoS file system of claim 1, wherein the file attributes and addresses of the data blocks are located in an i-node of the multiQoS file system.

6. The multiQoS file system of claim 1, wherein the host reads the current QoS in the block addresses before the file migrates and the host writes the new QoS in the block addresses after the file migrates.

7. The multiQoS file system of claim 1, wherein the host migrates the file in chunks from the first QoS VLUN to the second QoS VLUN.

8. The multiQoS file system of claim 1, further comprising a management client coupled to a management controller to receive and transmit information technology (IT) administrator input to the host.

9. The multiQoS file system of claim 8, wherein the management client is configured to receive IT administrator input for user capacity, file type, capacity threshold, migration size, and/or a migration rule.

10. The multiQoS file system of claim 1, wherein the migration rule includes a value file type.

11. A method of file migration between different quality of Service (QoS) in a multiple quality of service (multiQoS) file system, comprising:
  (a) testing a file with an i-node that is not identified for migration and computing a new QoS of the file by comparing a migration rule to a rule attribute of the file, wherein the file has data blocks, wherein each data block has a block address that encodes a QoS and addresses the data block;
  (b) migrating the file from the current QoS to the new QoS;
  (c) writing each data block of the file to a performance band of a disk drive that corresponds to the new quality of service virtual logical unit number (QoS VLUN), wherein the performance band is one of a plurality of performance bands allocated on contiguous data zones in the disk drive;
  (d) updating the current QoS to the new QoS;
  (e) receiving an input/output (I/O) request associated with the file after step (c); and
  (f) prioritizing the I/O request with a first queue of I/O requests to the performance band relative to a second queue of I/O requests to another of the plurality of performance bands of the disk drive.

12. The method of claim 11, wherein a lower block address represents the current QoS and a higher block address represents the new QoS.

13. The method of claim 11, further comprising setting a migration flag before migrating the file from the current QoS to the new QoS.

14. The method of claim 11, further comprising setting the migration flags for a plurality of files before migrating the plurality of files.

15. A method of migration of files from a current quality of service virtual logical unit number (QoS VLUN) to a new QoS VLUN in a multiple quality of service (multiQoS) file system containing i-nodes, comprising:
  (a) assigning a first i-node of a file of the multiQoS file system to a variable I;
  (b) testing if the variable I is greater than a last i-node of the multiQoS file system, and if greater, waiting for the next scan of all of the i-nodes of the multiQoS file system, and if not greater, testing the file is not identified for migration and computing a new quality of service (QoS) for the file using migration rule(s);
  (c) identifying the file for migration when the current QoS of the file does not equal the new QoS of the file;
  (d) migrating the file from the current QoS VLUN to the new QoS VLUN;
  (e) writing the file to a performance band of a plurality of performance bands allocated on contiguous data zones of a storage device that corresponds to the new QoS VLUN, wherein the file has an attribute and data blocks, wherein each data block has a logical block address that includes bits to encode a current QoS and bits to address the data block;
  (f) assigning a next i-node of the next file of the multiQoS file system to the variable I;
  (g) updating the current QoS to the new QoS;
  (h) receiving an input/output (I/O) request associated with the file after step (e); and
  (i) prioritizing the I/O request with a first queue of I/O requests to the performance band relative to a second queue of I/O requests to another performance band of a plurality of performance bands allocated on contiguous data zones of the disk drive.

16. The method of claim 15, wherein using the migration rule includes reading a value of file activity, capacity threshold, file size, or file type.

17. The method of claim 15, wherein step (c) includes setting a migration flag.

18. The method of claim 15, wherein steps (a) through (c) are performed on all files in the multiQoS file system before performing step (d).

19. The method of claim 15, wherein the next scan of step (b) runs as a background process, starts after a predetermined time, or starts when a condition is met.

20. The method of claim 15, wherein the condition is based on relative priority of the next scan with respect to other processes running in the host, recent consumption of host central processing unit (CPU) time for the method falls below a value, or the amount of time the method has slept.

21. The method of claim 15, wherein the file is identified for migration in the file attributes.

22. A method of migrating extents of a file between quality of service (QoS) of a multiple quality of service (multiQoS) file system, comprising:
  (a) computing a new QoS of an extent using a migration rule;
  (b) identifying the extent for migration when a current QoS of the extent does not equal the new QoS;
  (c) writing the identified extent of the file to a performance band of a disk drive that corresponds to a new quality of service virtual logical unit number (QoS VLUN) when the current QoS of the extent does not equal the new QoS according to step (b), wherein the extent of the file can be accessed on the new QoS VLUN, wherein the performance band is one of a plurality of performance bands allocated on contiguous data zones of the disk drive;
  (d) updating the current QoS to the new QoS;
  (e) receiving an input/output (I/O) request associated with the identified extent after step (c); and
  (f) prioritizing the I/O request with a first queue of I/O requests to the performance band relative to a second queue of I/O requests to another of the plurality of performance bands of the disk drive.

23. The method of claim 22, wherein using the migration rule includes reading a value of file activity, capacity threshold, file size, or file type.

24. The method of claim 22, wherein step (b) includes setting a migration flag.

25. The method of claim 22, wherein steps (a) through (c) are performed for the extent before steps (a) through (b) are performed on another extent.

26. The method of claim 22, wherein steps (a) through (b) are performed on all extents of the file before performing step (c) for any extent.

27. The method of claim 22, wherein steps (a) through (c) run as a background process, start after a predetermined time, or start when a condition is met.

28. The method of claim 22, wherein the condition is based on the relative priority of the method with respect to other processes, recent consumption of central processing unit (CPU) time by the method falls below a value, or the amount of a time the method has slept.

29. The method of claim 22, wherein the extent is identified for migration in an extent attribute.

30. The method of claim 22, wherein the method includes evaluating a migration rule using an extent attribute.

31. The method of claim 22, wherein after steps
    (a) through (b) are performed on all extents of the file, the method repeats for a next file in the file system.

32. The method of claim 22, wherein after steps
    (a) through (c) are performed on all extents of the file the method repeats for a next file in the file system.

33. A system, comprising:
a multiple quality of service (multiQoS) file system including a plurality of files, wherein each file has an attribute, a current quality of service (QoS), a migration flag, and data blocks, and wherein each data block has a logical block address that includes bits to encode a QoS and bits to address the data block;
a processor; and
a memory including program instructions executable by the processor to configure the multiQoS file system to receive a migration rule, to determine a file is not identified for migration and to compute a new QoS by comparing the migration rule to the attribute, to compare the current QoS to the new QoS and when not equal set the migration flag, to migrate the file from a current quality of service virtual logical unit number (QoS VLUN) to a new QoS VLUN when the migration flag is set, to write the file to a performance band of a disk drive that uses zone bit recording and that corresponds to the new QoS VLUN, wherein the performance band is allocated on contiguous data zones of the disk drive that uses zone bit recording, to select and prioritize input/output (I/O) requests to the performance band relative to I/O requests to at least one other performance band of the disk drive that uses zone bit recording, and to update the current QoS to the new QoS.

* * * * *

UNITED STATES PATENT AND TRADEMARK OFFICE
CERTIFICATE OF CORRECTION

PATENT NO.        : 8,438,138 B2             Page 1 of 1
APPLICATION NO.   : 12/454337
DATED             : May 7, 2013
INVENTOR(S)       : Rathi et al.

It is certified that error appears in the above-identified patent and that said Letters Patent is hereby corrected as shown below:

On the Title page, Item [74] "Attorney, Agent, or Firm", line 2, delete "Daniel J. Sherwiter" and insert -- Daniel J. Sherwinter --, therefor.

On Title page 2, in column 2, Item [56] under "Other Publications", line 4, delete "Sevice" and insert -- Service --, therefor.

In the Specification

In column 10, line 65, delete "C," and insert -- $C_1$, --, therefor.

In column 10, line 67, delete "Ho." and insert -- $H_0$. --, therefor.

Signed and Sealed this
Third Day of September, 2013

Teresa Stanek Rea
*Acting Director of the United States Patent and Trademark Office*